United States Patent
Tanada

[19]

[11] Patent Number: 6,117,018

[45] Date of Patent: Sep. 12, 2000

[54] ELONGATED SHAFT MEMBER

[75] Inventor: Akinori Tanada, Zama, Japan

[73] Assignee: Ricoh Company, Ltd., Tokyo, Japan

[21] Appl. No.: 09/172,137

[22] Filed: Oct. 14, 1998

Related U.S. Application Data

[62] Division of application No. 08/820,421, Mar. 18, 1997.

[30] Foreign Application Priority Data

| Mar. 18, 1996 | [JP] | Japan | 8-60938 |
| May 30, 1996 | [JP] | Japan | 8-137079 |
| Sep. 10, 1996 | [JP] | Japan | 8-238987 |
| Mar. 12, 1997 | [JP] | Japan | 9-57388 |
| Mar. 12, 1997 | [JP] | Japan | 9-57389 |

[51] Int. Cl.[7] .......................................... F16C 3/00
[52] U.S. Cl. ............................. 464/183; 464/181
[58] Field of Search ........................ 464/181, 183, 464/17, 179, 903; 285/903

[56] References Cited

U.S. PATENT DOCUMENTS

| 2,380,952 | 8/1945 | Dewey | 464/183 |
| 2,999,552 | 9/1961 | Fox | 464/183 |
| 3,338,069 | 8/1967 | Ortloff | 464/183 |
| 3,360,960 | 1/1968 | Massey | 464/183 |
| 3,525,237 | 8/1970 | Lari | 464/183 |
| 3,659,434 | 5/1972 | Wolfe | 464/181 |
| 3,874,194 | 4/1975 | Filepp et al. | 464/154 |
| 4,358,284 | 11/1982 | Federmann et al. | 464/183 |
| 4,785,434 | 11/1988 | Shoji et al. | 464/30 |
| 5,092,440 | 3/1992 | Nakano | 464/47 |
| 5,287,768 | 2/1994 | Amborn et al. | 464/183 |
| 5,320,580 | 6/1994 | Simon | 464/183 |

FOREIGN PATENT DOCUMENTS

| 60-91009 | 5/1985 | Japan | 46/183 |
| 5-180213 | 7/1993 | Japan | 464/181 |
| 5-208460 | 8/1993 | Japan . | |
| 7-329206 | 12/1995 | Japan . | |
| 2071272 | 9/1981 | United Kingdom | 464/183 |

*Primary Examiner*—Lynne H. Browne
*Assistant Examiner*—Greg Binda
*Attorney, Agent, or Firm*—Oblon, Spivak, McClelland, Maier & Neustadt, P.C.

[57] ABSTRACT

An elongated shaft member includes a main body made from synthetic resin material, a hollow portion formed inside the main body, which extends substantially in a direction of a center axis of the main body, first and second shaft portions formed at ends of the main body respectively, which are smaller in diameter than the main body, and through-holes formed in the first and second shaft portions respectively, which are substantially coaxial with the center axis.

10 Claims, 20 Drawing Sheets

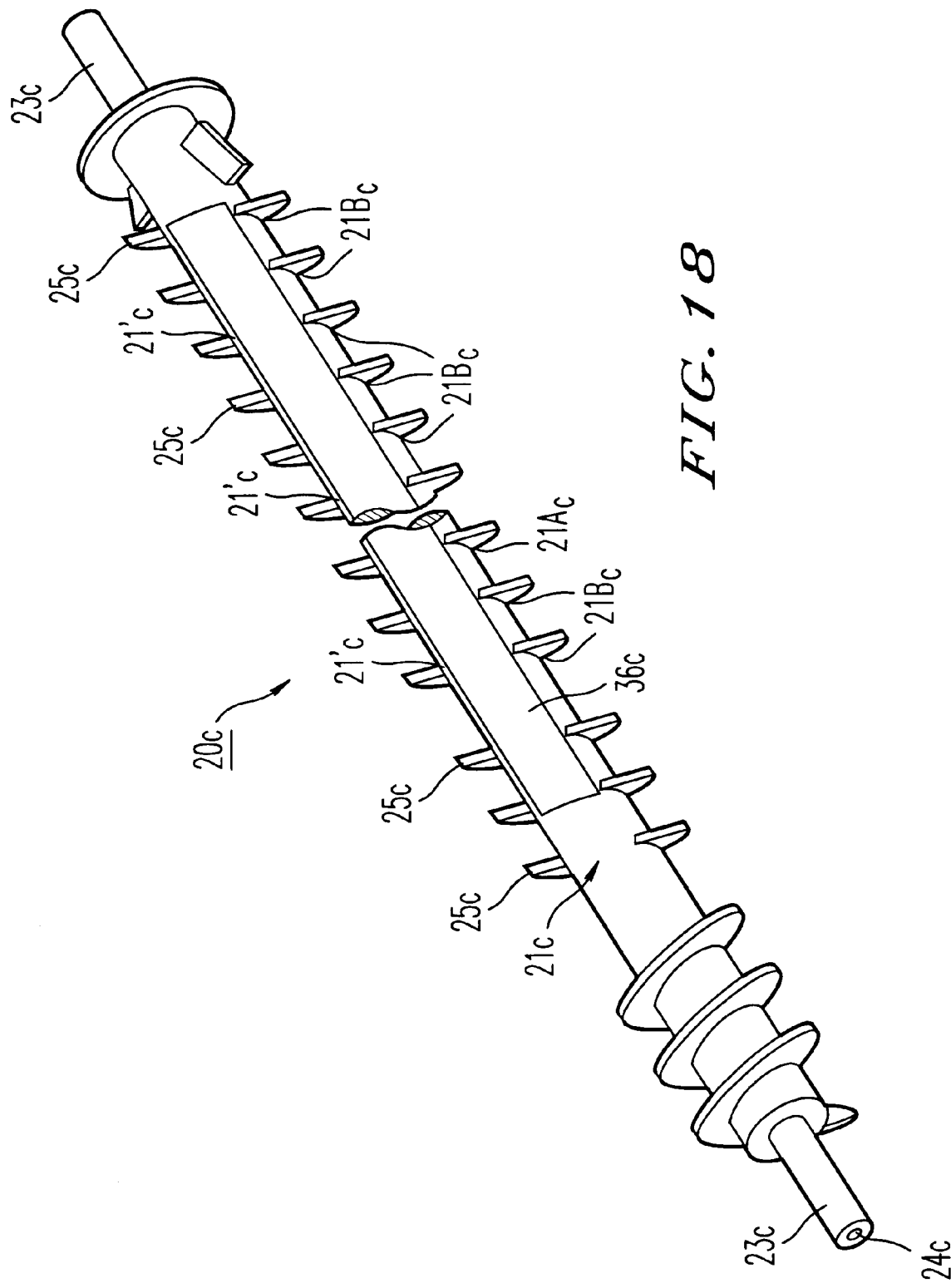

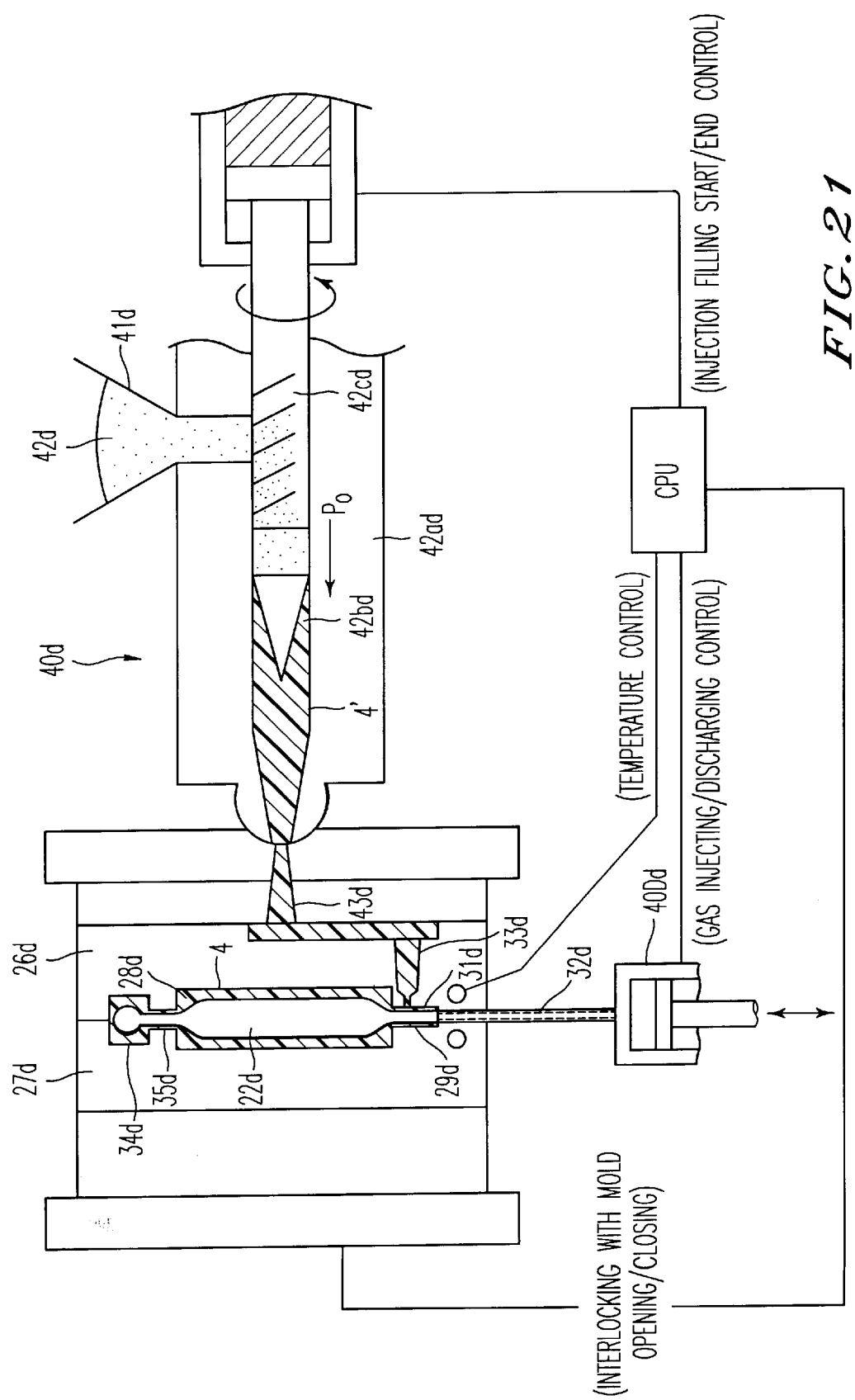

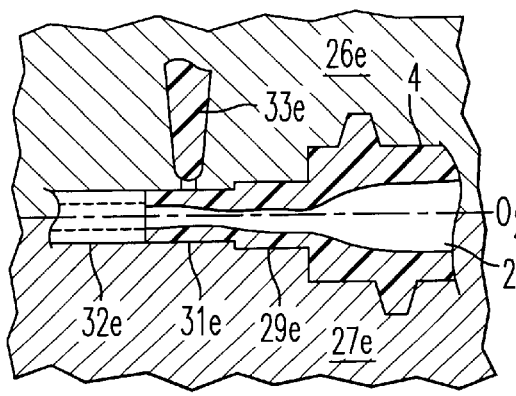
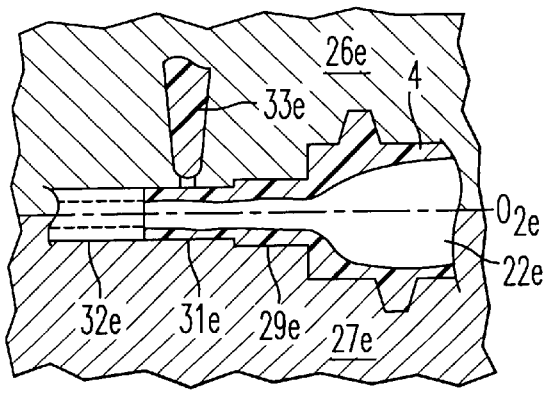
*FIG. 26A*  *FIG. 26B*
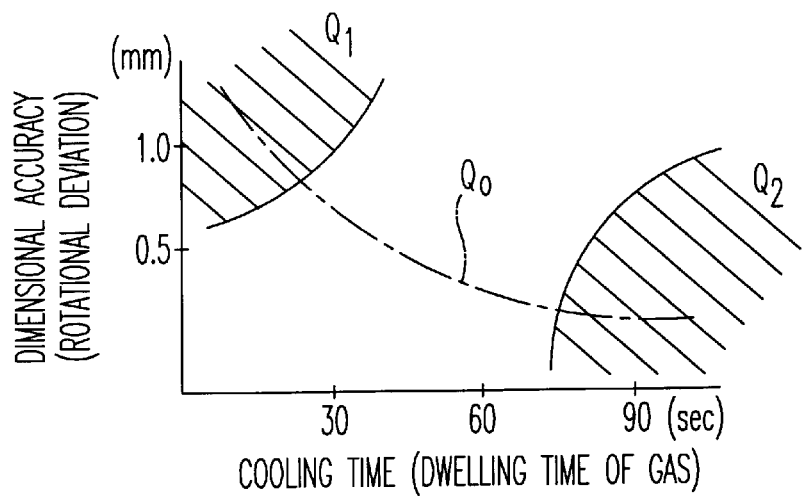
*FIG. 27A*
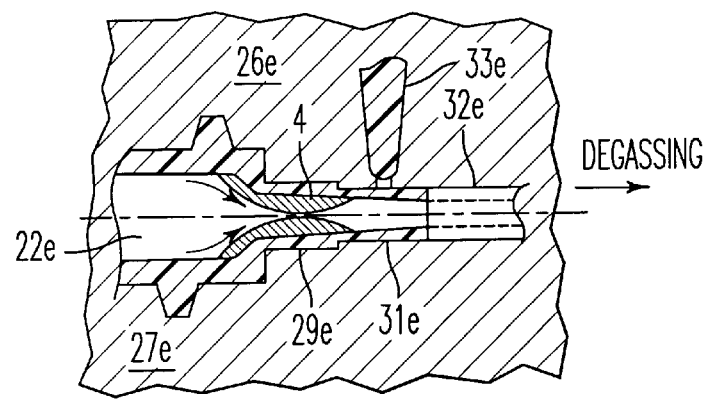
*FIG. 27B*

ELONGATED SHAFT MEMBER

This is a divisional application of Ser. No. 08/820,421 filed Mar. 18, 1997.

BACKGROUND OF THE INVENTION

1. Field of the Invention

This invention relates to an elongated shaft member which is made from synthetic resin material and comprises a hollow portion, formed inside of the elongated shaft member and substantially coaxial with a center axis, extending in a direction in which the center axis extends, and through-holes formed at ends in the extending direction of the hollow portion and substantially coaxial with the center axis, through which the hollow portion communicates with the outside. More particularly, this invention relates to an elongated shaft member which comprises a main body including a hollow portion, substantially coaxial with a center axis, extending in a direction in which the center axis extends. The main body includes shaft portions formed at ends of the main body respectively, the shaft portions being smaller in diameter than the main body and through-holes formed in the shaft portions respectively, through which the hollow portion communicates with the outside. The through-holes are substantially coaxial with the center axis. The invention relates to a mold, apparatus, and method for molding the elongated shaft member. Even more particularly, this invention relates to a mold, apparatus, and method suitable for molding an elongated shaft member provided with screws on the outer circumferential surface of its main body for conveying a toner, for example.

2. Description of the Prior Art

If an elongated shaft member is produced by cutting and processing a synthetic-resinous cylindrical bar, production costs are raised for synthetic resin material used for producing this elongated shaft member, and the elongated shaft member becomes heavier.

In an elongated shaft member used to convey a toner and the like, it is required to mount a plurality of spiral projections (fins) forming up screws for conveying a toner and the like on the outer circumferential surface of its main body at intervals and, in addition, form shaft portions at ends in the axial direction of the main body. This results in a complicate configuration. Thus, if a synthetic-resinous cylindrical bar is cut and processed to produce an elongated shaft member, many processing steps are taken and accordingly the cost of production is raised because of the complicated configuration of the products.

Heretofore, a method has been known known for molding this type of elongated shaft member integrally as a whole (see Japanese Patent Application Laid-Open Publication No. Hei 5-208460). As shown in FIG. 32, in this method (gas injection method), a gate 2 for supplying molten synthetic resin material is disposed on an extension line of a substantially center axis Oo of a molding cavity 1 of a mold, and a gas supplying pipe (gas supplying nozzle) 3 is connected to the gate 2 from a direction substantially perpendicular to the gate 2.

In this prior art technology, a predetermined amount of molten synthetic resin is measured to be injected into the cavity 1, the molten synthetic resin material 4 is then supplied from the gate 2, and thereafter pressure gas is injected into the molten synthetic resin from the gas supplying pipe 3. As a result, the molten synthetic resin material 4 is pressed onto the whole of an inner wall of the mold by means of the pressure gas and is spread thereon. Accordingly, an elongated shaft member is produced which has a hollow portion therein and has the same outer shape as the shape of the inner surface of the cavity 1.

In other words, as shown in FIG. 33, an elongated shaft member 8 is produced which has a main body 6 including a hollow portion 5 extending in a direction of a center axis O1 and has two small shaft portions 7, formed at both ends of the main body 6 which are smaller in diameter than the main body 6.

However, the elongated shaft member 8 molded according to this prior art technology is liable to suffer curving deformation caused by the non-uniformity of thickness because the pressure gas supplied through the gas supplying pipe 3 flows into the cavity 1 from a direction perpendicular to the center axis O1. Additionally, the elongated shaft member thus molded has a poor appearance because a hole 9 through which the hollow portion 5 communicates with the outside is produced in the outer surface of one of the shaft portions 7 as a result of supplying the pressure gas.

There is a case in which a metallic pipe is inserted into one or both of the ends of the body 6 in order to receive rotational force. When an elongated shaft member 8 is molded in which a metallic pipe 7 is inserted into one end of the body 6, the metallic pipe 7 is set on the side of the cavity 1 far from the gate 2, as shown in FIG. 34, for example. After that, the molten synthetic resin material 4 is injected from the gate 2 shown in FIG. 32, and the pressure gas is injected into the molten synthetic resin 4 staying in the cavity 1 from the gas supplying pipe 3.

However, the molten resin practically measured per molding cycle has fluctuations in quantity. Fluctuations in hollow rate occur in accordance with the fluctuations in quantity. For this mold, molten resin corresponding to 70 percent of the capacity of the cavity 1 is measured and injected so that a resultant molding has a hollow rate of 30 percent in volume. Accordingly, in the case of a large amount of molten resin, a concentration 10 of the molten synthetic resin material 4 occurs in the vicinity of the metallic pipe 7 far from the gate 2. This concentration 10 is difficult to be hardened, and therefore much cycle time for molding is taken. This brings about a rise in production costs. Further, the molding is deformed and becomes inferior in dimensional accuracy because the concentration 10 is considerably shrunk when the resin material thereof is hardened. Further, the finished elongated shaft member has an undesirably thicker part corresponding to the hardened resin of the concentration 10.

On the other hand, in the case of a lesser amount of synthetic resin material to be injected, a less-thickness part occurs in the vicinity of the metallic pipe 7 far from the gate 2.

In a case in which the metallic pipe 7 is inserted into both ends of the elongated shaft member 8, the gate 2 and the gas supplying pipe 3 must be mounted perpendicularly to the center axis Oo. Likewise, in this case, the pressure gas from the gas supplying pipe 3 turns perpendicularly and flows into the cavity 1. Therefore, the molding suffers deformation caused by the non-uniformity of thickness. Additionally, a similar disadvantage occurs because a concentration 10 is generated in the vicinity of the metallic pipe 7 far from the gate 2.

SUMMARY OF THE INVENTION

It is therefore an object of the present invention to provide an elongated shaft member which is capable of being integrally molded, pleasing in appearance, cheaper, light in weight, and has less deformation. Additionally, it is an object of the present invention to provide a mold, apparatus, and method for molding the elongated shaft member.

In order to achieve the object, a molding apparatus according to an aspect of the present invention is characterized in that, in a molding apparatus for molding an elongated shaft member, the elongated shaft member comprises the following: a main body made from synthetic resin material; an elongated hollow portion, formed inside of the main body, extending in a direction of an axis substantially coaxial with a center axis of the main body, first and second shaft portions formed at ends of the main body respectively, the first and second shaft portions being smaller in diameter than the main body; and through-holes formed in the first and second shaft portions respectively, through which the elongated hollow portion communicates with an outside, the through-holes being substantially coaxial with the center axis of the main body. The molding apparatus cavity for forming the main body of the elongated shaft member, the main cavity having a cavity center axis corresponding to the center axis of the main body; first and second shaft portion cavities for forming the first and second shaft portions, respectively; a medium injection portion for injecting a hollow-portion forming medium used to form the hollow portion into the main cavity through the first shaft portion cavity along the cavity center axis; a resin injection portion formed at a side closer to the main cavity than the medium injection portion for injecting molten resin thereinto and a surplus-resin receiving cavity for receiving surplus resin through the second shaft portion cavity. The surplus resin of the molten resin which has been injected into the main cavity is produced as a result of injecting the hollow-portion forming medium thereinto; the molding apparatus also includes a medium injection device for injecting the hollow-portion forming medium from the injection portion by given pressure; and a resin filling device for filling the cavities with the molten resin through the resin injection portion by given pressure.

In the molding apparatus, the resin filling device is controlled by a control device which allows the resin filling device to inject a predetermined amount of molten resin into the cavities under given pressure and thereafter changes the given pressure to such stagnation pressure that the molten resin stagnates in the resin injection portion. The medium injection device is controlled by a medium control device such that, after the resin filling device completes injecting the predetermined amount of molten resin thereinto, medium injecting pressure of the medium injection device is regulated to inject the hollow-portion forming medium thereinto, the medium injecting pressure being larger than the stagnation pressure.

The molding apparatus further comprises a medium injection control device by which, after the resin filling device completes injecting the predetermined amount of molten resin into the cavities, the medium injection device is allowed to inject the hollow-portion forming medium into the molten resin and is operated until an inner surface of the molten resin which has been formed to have a hollow portion inside of the molten resin by means of the hollow-portion forming medium becomes stable.

In the molding apparatus, stability of the inner surface of the molten resin is fixed when a temperature of the inner surface of the molten resin that stays at a position at which the molten resin staying in the first shaft portion cavity and the molten resin staying in the main cavity are connected to each other becomes less than a softening point.

The molding apparatus further comprises a removing device for removing the hollow-portion forming medium from the hollow portion after the medium injection device has injected the hollow-portion forming medium into the second shaft portion cavity through the first shaft portion cavity and the main cavity.

In the molding apparatus, a total amount of a filling amount of the molten resin injected by the resin filling device and an injected amount of the hollow-portion forming medium injected by the medium injection device is larger than a total amount of a capacity of the main cavity and each capacity of the first and second shaft portion cavities.

In the molding apparatus, the hollow-portion forming medium is gas or liquid.

The molding apparatus further comprises an insert member, disposed in the first shaft portion cavity or the second shaft portion cavity, having a through-hole coaxial with the cavity center axis.

The molding apparatus further comprises insert members, disposed in the first shaft portion cavity and the second shaft portion cavity, each having a through-hole coaxial with the cavity center axis.

Preferably, the through-hole is a conical hole that becomes gradually larger in diameter toward the main cavity.

The molding apparatus further comprises a temperature regulating member disposed in the vicinity of the medium injection portion, which is controlled by a temperature controlling device so that the molten resin with which the medium injection portion is filled by means of the resin filling device maintains a molten state.

In the molding apparatus, the temperature controlling device operates at least until the hollow-portion forming medium passes through the molten resin in the first shaft portion cavity and thereafter is injected into the molten resin with which the main cavity as filled.

In order to achieve the object, a molding apparatus according to another aspect of the present invention is characterized in that, in a molding apparatus for molding an elongated shaft member, the elongated shaft member comprises the following: a main body made from synthetic resin material; an elongated hollow portion, formed inside of the main body, extending in a direction of an axis substantially coaxial with a center axis of the main body; first and second shaft portions formed at ends of the main body respectively, the first and second shaft portions being smaller in diameter than the main body; and through-holes formed in the first and second shaft portions respectively, through which the elongated hollow portion communicates with an outside, the through-holes being substantially coaxial with the center axis of the main body. The molding apparatus comprises: a mold at least comprising the following: a main cavity for forming the main body of the elongated shaft member, the main cavity having a cavity center axis corresponding to the center axis of the main body; first and second shaft portion cavities for forming the first and second shaft portions; respectively; a medium injection portion for injecting a hollow-portion forming medium used to form the hollow portion into the main cavity through the first shaft portion cavity along the cavity center axis; a resin injection portion, formed at a side closer to the main cavity than the medium injection portion, for injecting molten resin thereinto; and a surplus-resin receiving cavity for receiving surplus resin through the second shaft portion cavity, the surplus resin of the molten resin which has been injected into the main cavity being produced as a result of injecting the hollow-portion forming medium thereinto; medium injection means for injecting the hollow-portion forming medium from the injection portion by given pressure; and resin filling means for filling the cavities with the molten resin through the resin injection portion by given pressure.

In order to achieve the object, a molding apparatus according to still another aspect of the present invention is characterized in that, in a molding apparatus for molding an elongated shaft member, the elongated shaft member comprises the following: a main body made from synthetic resin material; an elongated hollow portion, formed inside of the main body, extending in a direction of an axis substantially coaxial with a center axis of the main body; first and second shaft portions formed at ends of the main body respectively, the first and second shaft portions being smaller in diameter than the main body; and through-holes formed in the first and second shaft portions respectively, through which the elongated hollow portion communicates with an outside, the through-holes being substantially coaxial with the center axis of the main body. The molding apparatus includes a mold which comprises the following: a main cavity for forming the main body of the elongated shaft member, the main cavity having a cavity center axis corresponding to the center axis of the main body; first and second shaft portion cavities for forming the first second shaft portions formed at ends of the main body of the elongated shaft member, respectively; a medium injection portion for injecting a hollow-portion forming medium used to form the hollow portion into the main cavity through the first shaft portion cavity along the cavity center axis; a resin injection portion, formed at a side closer to the main cavity than the medium injection portion, for injecting molten resin thereinto; a surplus-resin receiving cavity for receiving surplus resin through the second shaft portion cavity, the surplus resin of the molten resin which has been injected into the main cavity being produced as a result of injecting the hollow-portion forming medium thereinto; and a medium discharging portion for allowing the hollow-portion forming medium to flow outward from a side opposite to a side that communicates with the second shaft portion cavity of the surplus-resin receiving cavity; a medium injection device for injecting the hollow-portion forming medium from the injection portion by given pressure; and a resin filling device for filling the cavities with the molten resin through the resin injection portion by given pressure.

In this molding apparatus, the medium discharging portion is opened by an opening-and-closing means when the molten resin with which the surplus-resin receiving cavity is filled is in a desired hardening state, and thereafter the hollow-portion forming medium is discharged through the medium discharging portion outward.

In this molding apparatus, the resin filling device is controlled by a control device that allows the resin filling device to inject a predetermined amount of molten resin into the cavities under given pressure and thereafter changes the given pressure to such stagnation pressure that the molten resin stagnates in the resin injection portion, and the medium injection device is controlled by a medium control device such that, after the resin filling device completes injecting the predetermined amount of molten resin thereinto, medium injecting pressure of the medium injection device is regulated to inject the hollow-portion forming medium thereinto, the medium injecting pressure being larger than the stagnation pressure and allowing the hollow-portion forming medium, when the molten resin with which the surplus-resin receiving cavity is filled is in a desired hardening state, to flow through the molten resin that is in the desired hardening state toward the medium discharging portion.

In order to achieve the object, a molding method according to an aspect of the present invention is characterized in that, in a molding method of molding an elongated shaft member, the elongated shaft member comprises the following: a main body made from synthetic resin material, an elongated hollow portion, formed inside of the main body, extending in a direction of an axis substantially coaxial with a center axis of the elongated shaft member; first and second shaft portions formed at ends of the main body respectively, the first and second shaft portions being smaller in diameter than the main body; and through-holes formed in the first and second shaft portions respectively, through which the elongated hollow portion communicates with an outside, the through-holes being substantially coaxial with the center axis of the elongated shaft member. The molding method comprises the following: a resin injecting step of injecting molten synthetic resin material from a direction perpendicular to a cavity center axis corresponding to the center axis of the elongated shaft member into a resin injection portion formed at an end of a main cavity that has the cavity center axis and serves to mold the main body of the elongated shaft member; a hollow-portion forming medium injecting step of injecting a hollow-portion forming medium into the main cavity from a direction parallel to the cavity center axis so as to, while pressing the molten synthetic resin material onto an inner surface of the main cavity and forming a hollow portion, move the molten synthetic resin material from an end of the main cavity to the other end thereof and thereafter guiding a surplus of the molten synthetic resin material from the other end of the main cavity to a surplus-resin receiving cavity without changing predetermined pressure of the hollow-portion forming medium; and a taking-out step of cooling and hardening at least both inner and outer surfaces of the molten synthetic resin material and thereafter taking a resultant molding out of the main cavity.

The molding method further comprises a removing step of removing the hollow-portion forming medium that stays in the hollow portion, the removing step being between the hollow-portion forming medium injecting step and the taking-out step.

In the molding method, the time during which pressure of the hollow-portion forming medium in the hollow portion is kept constant is set in view of dimensional accuracy of the elongated shaft member and progress in hardening of the molten synthetic resin material.

In the molding method, the hollow-portion forming medium is injected immediately before or immediately after stopping the injection of the molten synthetic resin material.

In order to achieve the object, a molding method according to another aspect of the present invention is characterized in that, in a molding method of molding an elongated shaft member, the elongated shaft member comprises the following: a main body made from synthetic resin material; an elongated hollow portion, formed inside of the main body, extending in a direction of an axis substantially coaxial with a center axis of the elongated shaft member; first and second shaft portions formed at ends of the main body respectively, the first and second shaft portions being smaller in diameter than the main body; and through-holes formed in the first and second shaft portions respectively, through which the elongated hollow portion communicates with an outside, the through-holes being substantially coaxial with the center axis of the elongated shaft member. The molding method comprises the following steps: injecting molten synthetic resin material from a direction perpendicular to a cavity center axis corresponding to the center axis of the elongated shaft member into a resin injection portion formed on the side of a first shaft portion cavity of cavities for molding the main body and the first and second shaft portions of the elongated shaft member, the cavities having the cavity center axis; injecting gas through a gas nozzle into the cavities from a direction parallel to the cavity center axis so as to, while pressing the molten synthetic resin material onto an inner surface of the cavities and forming a hollow portion, move the molten synthetic resin material to a second shaft portion cavity and thereafter guide a surplus, which is produced as a result of forming the hollow portion, of the molten synthetic resin material to a surplus-resin receiving cavity through the second shaft portion cavity; cooling and hardening the molten synthetic resin material while keeping the gas that stays in the hollow portion at predetermined pressure and thereafter discharging the gas from the hollow portion; and taking a resultant molding out of the cavities and cutting off unnecessary parts of the resultant molding.

According to the molding apparatus and method, since the hollow-portion forming medium is injected from a direction parallel to the cavity center axis while inflating and pressing the molten synthetic resin material onto an inner surface of the cavities so that a hollow portion is formed, and, as a result of forming the hollow portion, a surplus of the molten synthetic resin material in the cavities is guided to a surplus-resin receiving cavity and is discharged, an elongated shaft member can be manufactured which is high in dimensional accuracy and has less deformation.

Additionally, since dwelling pressure of the hollow-portion forming medium in the hollow portion is set to be larger than back pressure (stagnating pressure) on the side of the molding apparatus, the though-hole is prevented from being stopped with the molten synthetic resin material which has flowed from the side of the molding apparatus in the dwelling of the hollow-portion forming medium.

Further, since the dwelling time is selected in view of the dimensional accuracy of the elongated shaft member and the hardening progress of the molten synthetic resin material, it is possible to avoid the production of inferior moldings.

In a molding apparatus in which a cooling temperature in the vicinity of a gas nozzle of a mold is set to be higher than a cooling temperature in the vicinity of a molding cavity, it is possible to restrain a hardening speed of the molten synthetic resin material in the vicinity of the gas nozzle while shortening a molding cycle of the elongated shaft member. Therefore, when gas is injected into molten synthetic resin material, the gas can be smoothly injected thereinto.

In order to achieve the object, a mold according to an aspect of the present invention is characterized in that, in a mold for molding an elongated shaft member, the elongated shaft member comprises the following: a main body made from synthetic resin material; an elongated hollow portion, formed inside of the main body, extending in a direction of an axis substantially coaxial with a center axis of the main body; first and second shaft portions formed at ends of the main body respectively, the first and second shaft portions being smaller in diameter than the main body; and through-holes formed in the first and second shaft portions respectively, through which the elongated hollow portion communicates with an outside, the through-holes being substantially coaxial with the center axis of the main body. The mold comprises the following: a main cavity for forming the main body of the elongated shaft member, the main cavity having a cavity center axis corresponding to the center axis of the main body; first and second shaft portion cavities for forming the first and second shaft portions, respectively; a medium injection portion for injecting a hollow-portion forming medium used to form the hollow portion through the first shaft portion cavity; a resin injection portion, formed at a side closer to the main cavity than the medium injection portion, for injecting molten resin thereinto; and a surplus-resin receiving cavity for receiving through the second shaft portion cavity a surplus of the molten resin that has been injected into the cavities, the surplus unnecessary for the elongated shaft member being produced as a result of injecting the hollow-portion forming medium thereinto.

In the mold, the surplus-resin receiving cavity is substantially coaxial with the cavity center axis of the main cavity.

In the mold, the resin injection portion is disposed to inject the molten resin from a direction perpendicular to a direction in which the hollow-portion forming medium is injected.

In the mold, at least one of the first and second shaft portion cavities is a space where an insert member having a through-hole is disposed.

In order to achieve the object, a mold according to another aspect of the present invention is characterized in that, in a mold for molding an elongated shaft member, the elongated shaft member comprises the following: a main body made from synthetic resin material; an elongated hollow portion, formed inside of the main body, extending in a direction of an axis substantially coaxial with a center axis of the main body; first and second shaft portions formed at ends of the main body respectively, the first and second shaft portions being smaller in diameter than the main body; and through-holes formed in the first and second shaft portions respectively, through which the elongated hollow portion communicates with an outside, the through-holes being substantially coaxial with the center axis of the main body. The mold comprises the following: a main cavity for forming the main body of the elongated shaft member, the main cavity having a cavity center axis corresponding to the center axis of the main body; first and second shaft portion cavities for forming the first and second shaft portions, respectively; a gas injection portion for injecting a gas used to form the hollow portion through the first shaft portion cavity into the main cavity; a resin injection portion, formed at a side closer to the main cavity than the gas injection portion, for injecting molten resin from a direction perpendicular to a direction in which the gas is injected; and a surplus-resin receiving cavity, connected to the main cavity through the second shaft portion cavity, for receiving a surplus of the molten resin that has been injected into the cavities, the surplus unnecessary for the elongated shaft member being produced as a result of injecting the gas thereinto.

According to this mold, since the surplus-resin receiving cavity is included which serves to receive surplus resin of the molten resin injected into the cavity, fluctuations in hollow rate can be absorbed. Therefore, it is possible to mold an elongated shaft member which is uniform in thickness and has less deformation.

In order to achieve the object, an elongated shaft member according to an aspect of the present invention is characterized in that an elongated shaft member made of a homogeneous monolithic resinous structure comprises the following: an elongated hollow portion, formed inside of the elongated shaft member, extending in a direction of an axis substantially coaxial with a center axis of the elongated shaft member; and through-holes formed at ends of the elongated shaft member in a direction in which the elongated hollow portion extends, respectively, through which the elongated hollow portion communicates with an outside, the through-holes being substantially coaxial with the center axis.

An elongated shaft member according to another aspect of the present invention is characterized in that, as a result of injecting a hollow-portion forming medium into molten resin from medium injecting means, there are formed a hollow portion extending along an axis substantially coaxial with a center axis of the elongated shaft member and through-holes, formed at ends of the elongated shaft member respectively, through which the elongated hollow portion communicates with an outside.

An elongated shaft member according to still another aspect of the present invention is characterized in that the elongated shaft member comprises the following: a main body made from synthetic resin material; an elongated hollow portion, formed inside of the main body, extending in a direction of an axis substantially coaxial with a center axis of the main body; first and second shaft portions formed at ends of the main body respectively, the first and second shaft portions being smaller in diameter than the main body; and through-holes formed in the first and second shaft portions respectively, through which the elongated hollow portion communicates with an outside, the through-holes being substantially coaxial with the center axis of the main body.

In this elongated shaft member, the first or second shaft portion is constructed of an insert member inserted in at least one of the ends of the main body, the insert member being made from material different from the synthetic resin material, and the through-hole is formed in the insert member.

In this elongated shaft member, the insert member is made from metallic material.

In this elongated shaft member, the through-hole becomes gradually larger in diameter from an end of the insert member which is exposed to the outside to the other end of the insert member which is buried in the main body.

In this elongated shaft member, an inner surface of the insert member which constitutes the through-hole is covered with the synthetic resin material from which the main body is made.

An elongated shaft member according to still another aspect of the present invention is characterized in that the elongated shaft member is made from synthetic resin material and comprises the following: an elongated hollow portion, formed inside of the elongated shaft member, extending in a direction of an axis substantially coaxial with a center axis of the elongated shaft member, through-holes formed at ends of the elongated shaft member in a direction in which the elongated hollow portion extends, respectively, through which the elongated hollow portion communicates with an outside, the through-holes being substantially coaxial with the center axis; and a plurality of projections, formed on an outer circumferential surface of the main body, spiraling in a longitudinal direction of the main body at intervals.

An elongated shaft member according to still another aspect of the present invention is characterized in that the elongated shaft member comprises the following: a main body made from synthetic resin material; an elongated hollow portion, formed side of the main body, extending in a direction in which a center axis of the elongated shaft member extends; shaft portions formed at ends of the main body respectively, the shaft portions being smaller in diameter than the main body; through-holes formed in the shaft portions respectively, through which the elongated hollow portion communicates with an outside, the through-holes being substantially coaxial with the center axis: and a longitudinal projection forming area on an outer circumferential surface of the main body, for forming a plurality of spiral projections at intervals in a longitudinal direction of the main body, the longitudinal projection forming area having a projection forming area part within a predetermined angle in a circumferential direction of the main body and a projection non-forming area part within a remaining angle excluding the predetermined angle, the projection non-forming area part having an outer surface radially lower than the outer surface of the projection forming area part so that the projection non-forming area part becomes equal in sectional thickness to the projection forming area part.

The elongated shaft member according to the present invention has an advantage in that curving deformation does not easily occur when molding, and the elongated shaft member is light in weight and is pleasing in appearance.

Especially, in the elongated shaft member provided with the insert member having a through-hole at the shaft portion of the elongated shaft member, an inner surface of the insert member which constitutes the through-hole for receiving rotational power is covered with the synthetic resin material from which the main body is made, and this synthetic resin material adheres to the inner surface thereof. Therefore, pulling intensity is heightened when the insert member is pulled from its axial direction.

In the insert member in which the through-hole is conical (i.e., tapered) in section, it is possible to smoothly inject the molten synthetic resin material into the cavity and inject gas into the molten synthetic resin material. This lessens the production of inferior moldings.

BRIEF DESCRIPTION OF THE DRAWINGS

FIG. 18 is a detailed perspective view showing the whole of the elongated shaft member shown in FIG. 16.

FIG. 21 is an explanatory view showing a schematic construction of an apparatus for molding an elongated shaft member according to the present invention.

FIG. 24(*a*), shows a state in which molten synthetic resin material is injected into a cavity of a mold.

FIG. 24(*b*) shows a state in which pressure gas is injected into the molten synthetic resin material, and the pressure of the gas is kept constant for a given time so as to cool and harden the resin material.

FIG. 24(*c*) shows a state in which the pressure gas existing in a hollow portion of a semi-finish molding shaped by the cooling and hardening is discharged.

FIG. 24(*d*) is a sectional view showing the semi-finish molding taken out of the mold.

FIG. 24(*e*) shows an elongated shaft member formed by cutting unnecessary parts of the semi-finish molding.

FIGS. 26(*a*) and 26(*b*) are enlarged views, each showing a part in the vicinity of a nozzle of the mold.

FIG. 26(*a*) shows a gas passage in a case where viscosity of synthetic resin material used for molding an elongated shaft member is high.

FIG. 26(*b*) shows a gas passage in a case where viscosity of synthetic resin material used for molding an elongated shaft member is low.

FIGS. 27(*a*) and 27(*b*) are explanatory views showing a relationship between dwelling time of pressure gas and dimensional accuracy of the elongated shaft member.

FIG. 27(*a*) is a characteristic curve view showing a relationship between the dwelling time of the pressure gas and the dimensional accuracy of the elongated shaft member.

FIG. 27(*b*) is a partially enlarged view of the mold near the gas nozzle, showing a disadvantage occurring when the dwelling time of the pressure gas is short.

FIG. 28(*a*) shows a state in which a resin injection portion is choked because the back pressure is higher than the dwelling pressure.

FIG. 28(*b*) shows a state in which the resin injection portion is not choked because the back pressure is lower than the dwelling pressure.

FIG. 29 is an explanatory view showing a schematic construction of the apparatus for molding the elongated shaft member according to the present invention.

FIG. 30 is block diagram showing a relationship between each control means and a CPU of the molding apparatus of the other embodiment.

FIGS. 31(*a*) to 31(*e*) are explanatory views showing another example of the molding method of molding the elongated shaft member according to the present invention.

FIG. 31(*a*) shows a state in which molten synthetic resin material is injected into a cavity of a mold.

FIG. 31(*b*) shows a state in which pressure gas is injected into the molten synthetic resin material and the pressure of the gas is kept constant for a given time so as to cool and harden the resin material;

FIG. 31(*c*) shows a state in which the pressure gas existing in a hollow portion of a semi-finish molding shaped by the cooling and hardening is discharged.

FIG. 31(*d*) is a sectional view showing the semi-finish molding taken out of the mold.

FIG. 31(*e*) shows an elongated shaft member formed by cutting unnecessary parts of the semi-finish molding.

DESCRIPTION OF THE PREFERRED EMBODIMENTS

First Embodiment

Figure 1:
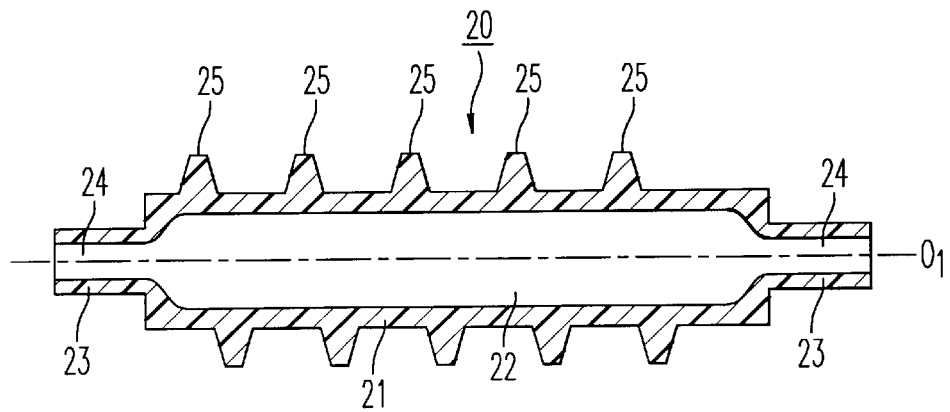
FIG. 1 is a longitudinal sectional view showing an elongated shaft member according to the present invention.

In FIG. 1, reference numeral 20 denotes an elongated shaft member. The elongated shaft member 20 has a cylindrical main body 21 made from synthetic resin. The main body 21 has a hollow portion 22 which is substantially coaxial with a center axis O1 and extends in a direction of the center axis O1. At both ends of the main body 21, first and second cylindrical shaft portions 23 are formed which are smaller in diameter than the main body 21. A through-hole 24 through which the hollow portion 22 communicates with an external portion is provided with each of the shaft portions 23. The through-hole 24 is substantially coaxial with the center axis O1. On the outer surface of the main body 21, a plurality of spiral projections 25 serving as conveying screws are formed at intervals. The through-hole 24 is formed such that, after molten synthetic resin material is injected into a mold which will be described later, gas serving as a hollow-portion forming medium is injected from a direction parallel to the center axis O1, according to a gas injection method. Instead of gas (fluid), liquid may be used as the hollow-portion forming medium.

Figure 2:
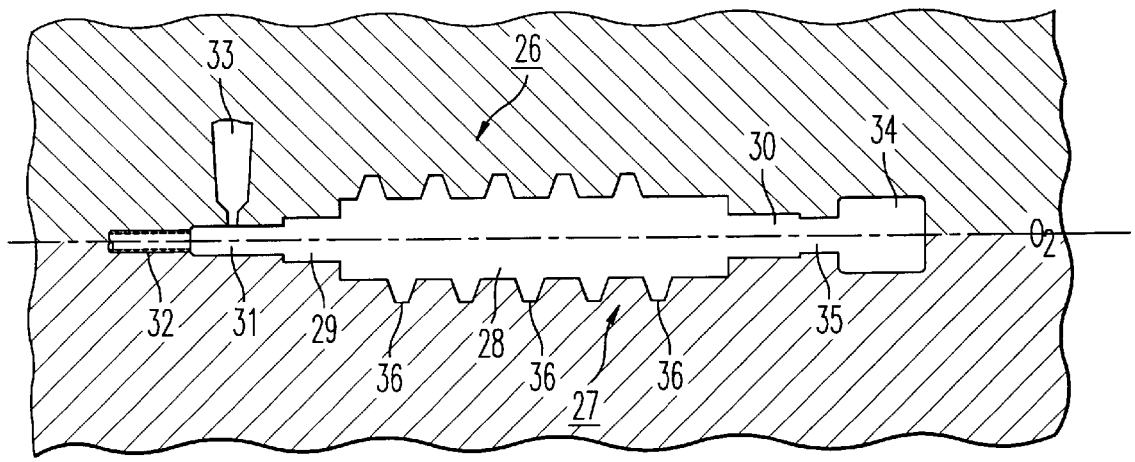
FIG. 2 is a fragmentary sectional view showing a mold for the elongated shaft member shown in FIG. 1.

FIG. 2 shows a mold for the elongated shaft member 20 shown in FIG. 1. In FIG. 2, reference numeral 26 denotes a stationary mold, and 27 denotes a movable mold. A main body cavity (semi-finish molding cavity) 28 corresponding to the main body 21 is defined between the stationary mold 26 and the movable mold 27. The main body cavity 28 has a center axis O2 corresponding to the center axis O1 of the main body 21. At both ends of the main body cavity 28, first and second cavities (semi-finish molding cavities) 29, 30 are formed corresponding to the first and second shaft portions made from synthetic resin. At one end of the main body cavity 28, a gas nozzle 32 (medium injecting portion) is mounted which is substantially coaxial with the center axis O2 for injecting gas from a gas pressure source into the main body cavity 28. A resin injecting portion 31 is formed between the gas nozzle 32 and the cavity 29 for injecting molten synthetic resin material into the main body cavity 28. A resin injecting passage 33 is formed in the stationary mold 26 for injecting the molten synthetic resin material into the resin injecting portion 31 from a direction (orthogonal direction) perpendicular to a gas-injecting direction of the gas nozzle 32. At the other end of the main body cavity 28, a surplus-resin receiving cavity 34 is formed for receiving a surplus of the molten synthetic resin material injected from the resin injecting portion 31. The surplus-resin receiving cavity 34 communicates with the main body cavity 28 through the cavity 30 via the second shaft portion 30 and a connecting passage 35. The surplus-resin receiving cavity 34 is substantially coaxial with the center axis O1. In the main body cavity 28, concaves 36 are formed in an inner wall thereof for forming projections 25.

Figure 3:
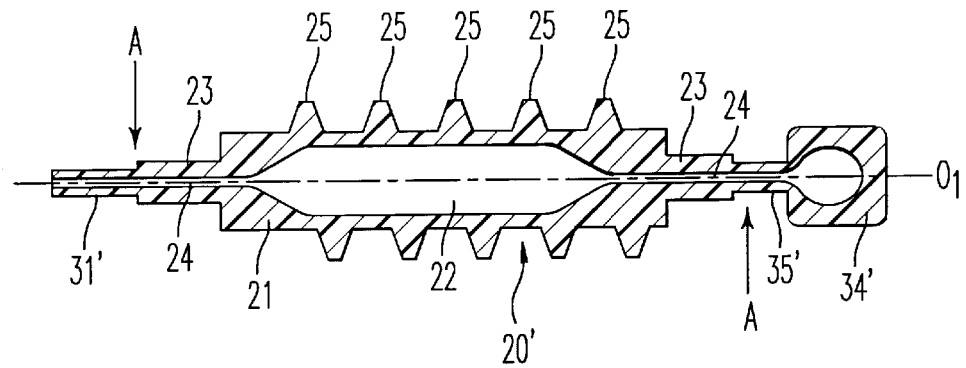
FIG. 3 is a longitudinal sectional view showing a semi-finish molding produced by the mold shown in FIG. 2.

In this mold, the molten synthetic resin material is injected into the resin injecting portion 31 through the resin injecting passage 33, and then the gas is supplied to the main body cavity 28 from the direction of the center axis O2. While being pressed onto the whole of the inner surface of the main body cavity 28 by pressure gas, the molten synthetic resin material is moved toward the surplus-resin receiving cavity 34. A surplus of the molten synthetic resin material which is an unnecessary part for the elongated shaft member 20 is moved toward the surplus-resin receiving cavity 34 from the direction of the center axis by the pressure gas so as to be pushed out, and therefore molten synthetic resin material 4 is carried substantially uniformly throughout the inner surface of the main body cavity 28. Thereby, as shown in FIG. 3, a hollow semi-finish molding 20' is formed of which an outer shape is the same as the inner shape of the mold.

The semi-finish molding 20' comprises a meat portion 31' corresponding to the resin injecting portion 31, a meat portion 35' corresponding to the connecting passage 35, and a surplus-meat portion 34' corresponding to the surplus-resin receiving cavity 34. The elongated shaft member 20 is formed by cutting the semi-finish molding 20' at points of arrows A, A.

In addition, with regard to a method for molding the elongated shaft member 20, refer to a molding method of an embodiment described later.

Second Embodiment

FIGS. 4 to 11 show a second embodiment of the elongated shaft member 20a according to the present invention. In FIGS. 4 to 11, at least one of the shaft portions 23 of the elongated shaft member 20 is used as a metallic pipe 23' for receiving rotating power.

Figure 4:
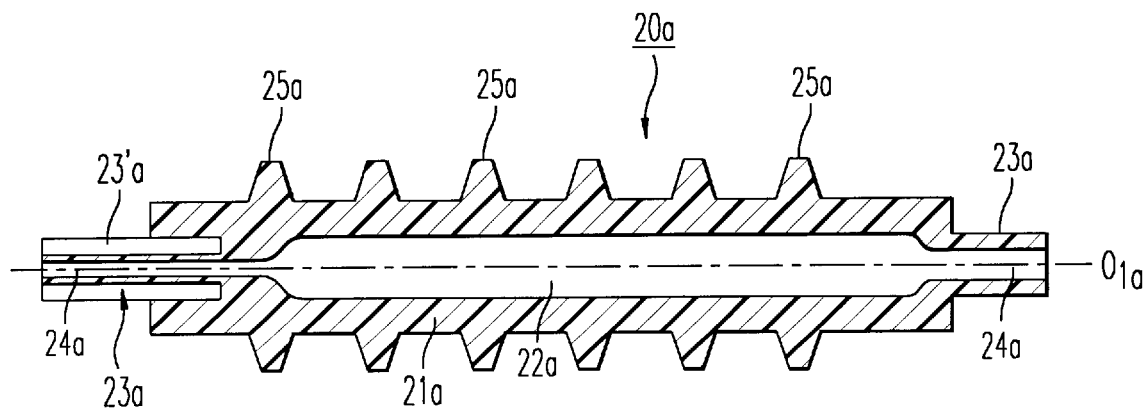
FIG. 4 is a longitudinal sectional view showing an elongated shaft member according to the present invention, in which one shaft portion comprises an insert member.
Figure 5:
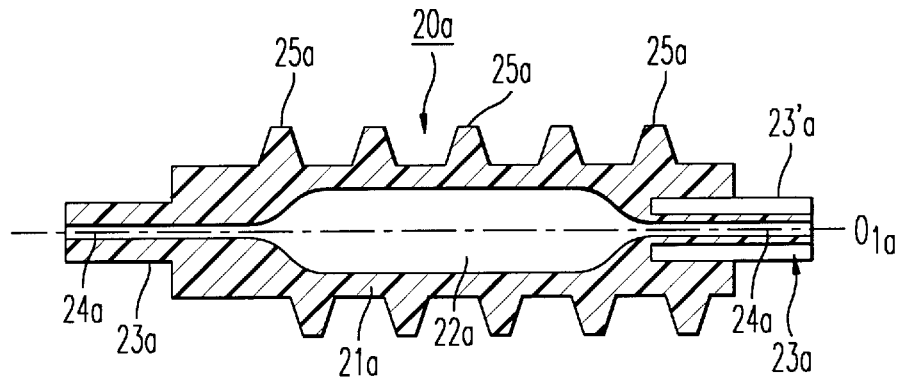
FIG. 5 is a longitudinal sectional view showing an elongated shaft member according to the present invention, in which the other shaft portion comprises an insert member.
Figure 6:
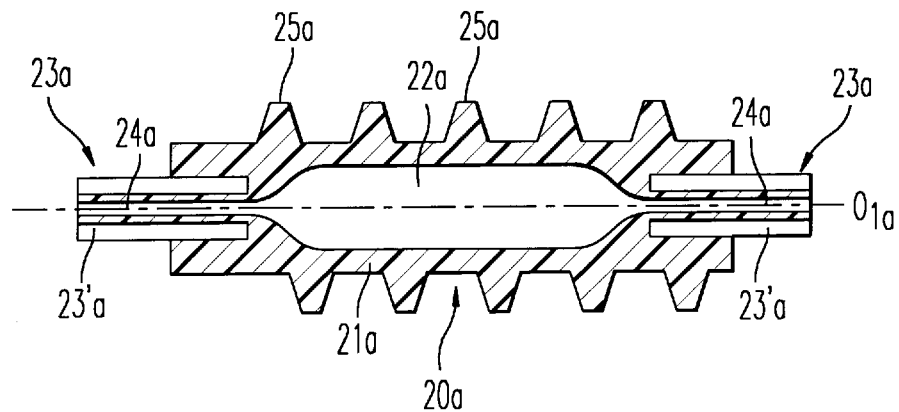
FIG. 6 is a longitudinal sectional view showing an elongated shaft member according to the present invention, in which the two shaft portions each comprise an insert member.

FIG. 4 shows an elongated shaft member 20a molded by inserting the metallic pipe 23'a as an insert member into one end closer to the nozzle 32a of the main body cavity 28a. FIG. 5 shows an elongated shaft member 20a molded by inserting the metallic pipe 23'a as an insert member into the other end closer to the surplus-resin receiving cavity 34a of the main body cavity 28a. FIG. 6 shows an elongated shaft member 20a molded by inserting the metallic pipe 23'a as an insert member into each of both ends of the main body cavity 28a. The metallic pipe 23'a is cylindrical and has the through-hole 24a in its axial direction. Herein, the metallic pipe 23'a is used as the insert member but, material other than resin synthetic material making the main body 21a may be used as the insert member. The insert member is not limited to metallic material.

The same mold as that shown in FIG. 2 may be used. In this case, the metallic pipe 23'a is disposed in at least one of the first and second shaft portion cavities 29a, 30a.

That is, in the case of the elongated shaft member 20a (see FIG. 4) in which the metallic pipe 23'a is inserted into one end of the main body 21a and the second shaft portion 23a at the other end of the main body 21a is made from synthetic resin material, the insert member 23'a is disposed in the first shaft portion cavity 29a at end one of the main body cavity 28a for molding the main body 21a. The gas from the gas pressure source is injected into the main body cavity 28a via the through-hole 24a of the metallic pipe 23'a.

In the case of the elongated shaft member 20a (see FIG. 5) in which the metallic pipe 23'a is inserted into the other end of the main body 21a and the first shaft portion 23a is made from synthetic resin material at one end of the main body 21a, the insert member is disposed in the second shaft portion cavity 30a at the other end of the main body cavity 28a for molding the main body 21a. The surplus-resin receiving cavity 34a communicates with the main body cavity 28a via the through-hole 24a of the metallic pipe 23'a.

In the case of the elongated shaft member 20a (see FIG. 6) in which the metallic pipe 23'a is inserted into each of the two ends of the main body 21a, the insert member 23'a is disposed in each of the cavities 29a and 30a. The gas nozzle 32a communicates with the main body cavity 28a via the through-hole 24a of the insert member 23'a disposed in the first shaft portion cavity 28a, and the surplus-resin receiving cavity 34a communicates with the main body cavity 28a via the through-hole 24a of the insert member 23'a disposed in the second shaft portion cavity 30a. The through-hole 24a of the metallic pipe 23'a is disposed substantially coaxially with the center axis O2a. The diameter of the through-hole 24a is uniform from an end surface exposed from the main body 21a of the metallic pipe 23'a to an end surface buried in the main body 21a.

A method for molding the elongated shaft member 20a shown in FIGS. 4 to 6 will be described hereinafter with reference to FIGS. 7 to 10.

FIGS. 7 to 10 show a method for molding the elongated shaft member 20a (see FIG. 6) in which the metallic pipe 23'a is mounted on the other end of the main body 21a.

Figure 7:
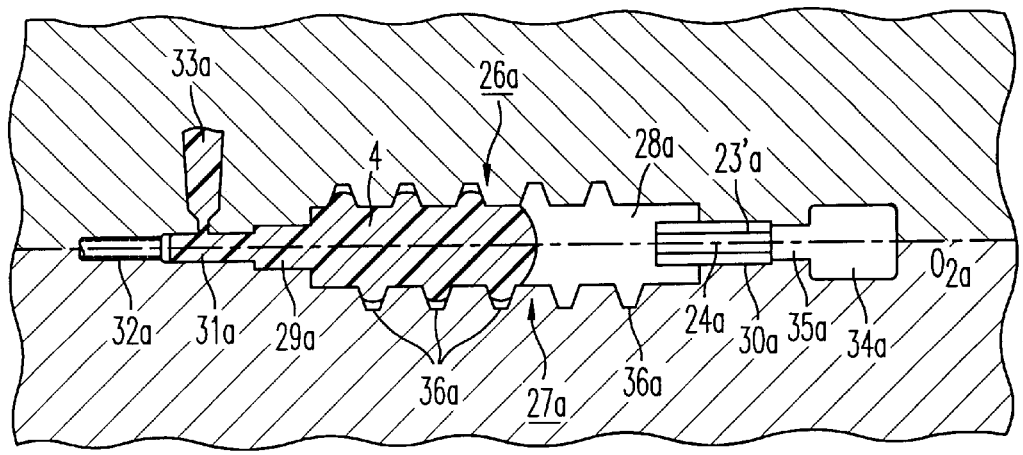
FIG. 7 is a fragmentary sectional view of the mold for the elongated shaft member shown in FIG. 5, showing a state in which molten synthetic resin material is injected into a molding cavity.
Figure 8:
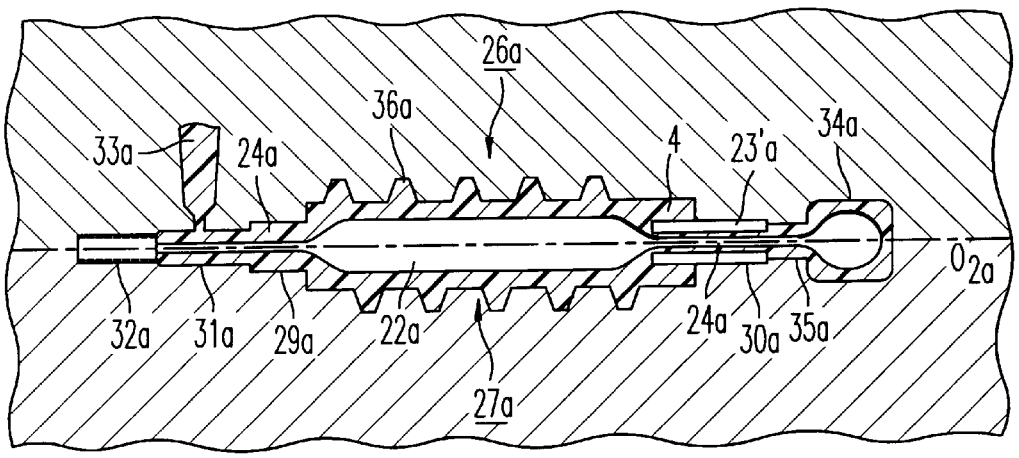
FIG. 8 shows a state in which pressure gas is injected into the molten synthetic resin material shown in FIG. 7 so as to inflate the resin material with the gas.

First, as shown in FIG. 7, the molten synthetic resin material 4 is injected into the resin injection portion 31a from the resin injecting passage 33a. Then, the molten synthetic resin material 4 is injected from the resin injection portion 31a into one end of the main body cavity 28a via the first shaft portion cavity 29a. In a state in which a predetermined amount of molten synthetic resin material 4 is injected in the main body cavity 28a, the injection of the molten synthetic resin material 4 is stopped. That is, the injection of the molten synthetic resin material 4 is stopped by short shot, or immediately before the injection is stopped, as shown in FIG. 8. the pressure gas is injected into the resin injection portion 31a from the gas nozzle 32a.

Figure 9:
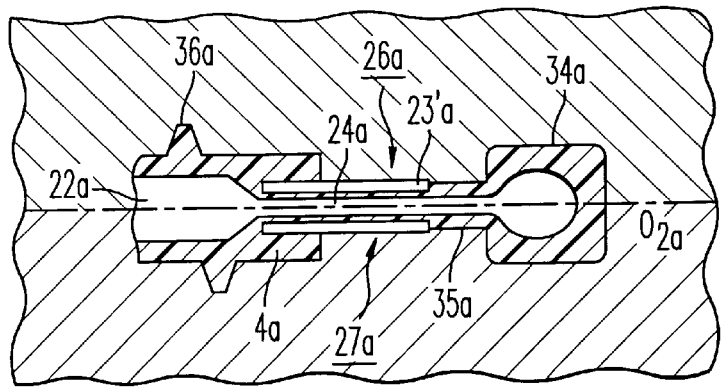
FIG. 9 is a partially enlarged sectional view showing a part in the vicinity of a surplus-resin receiving cavity of the mold shown in FIG. 8.

An external surface of the resin material 4 is brought into contact with an inner surface of the mold, and the resin material 4 is cooled and hardened by taking heat away from the contact place. However, the cooling and hardening progress in a central portion of the resin material 4 is slower than that in the external surface thereof. Accordingly, the molten resin material 4 of the central portion which is slow in the cooling and hardening progress is inflated and moved toward the other end of the main body cavity 28a by pressure of the pressure gas. By the pressure of the pressure gas, the molten synthetic resin material 4, as shown in FIG. 9. is moved toward the surplus-resin receiving cavity 34a via the other end of the body cavity 28a, the through-hole 24a of the metallic pipe 23'a, and the connecting passage 35a. The resin material 4 is pressed onto the inner surface of the main body cavity 28a by the pressure of the pressure gas, and the hollow portion 22a is formed therein. Fluctuations in hollow rate are absorbed by the surplus-resin receiving cavity 34a.

Since the molten synthetic resin material 4 is guided to the surplus-resin receiving cavity 34a via the through-hole 24a of the metallic pipe 23'a, an inner wall forming the through-hole 24a of the metallic pipe 23'a is covered with the synthetic resin material 4 integrated with the main body 21a. Accordingly, a contact area between the metallic pipe 23'a at the other end of the main body 21a and the main body 21a becomes large, and a pulling strength of the metallic pipe 23'a along the axial direction is heightened.

Figure 10:
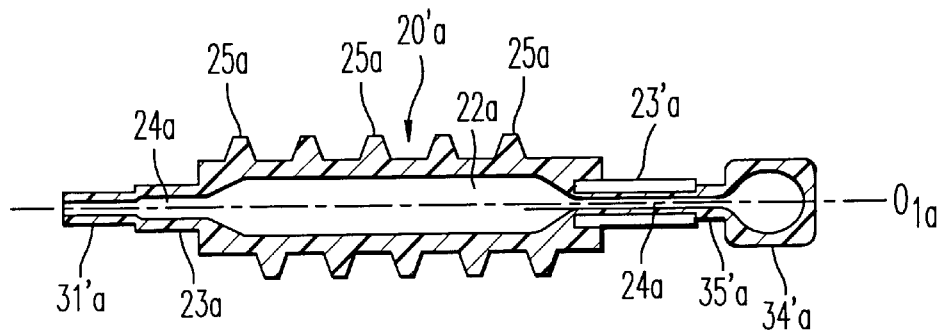
FIG. 10 is a longitudinal sectional view showing a semi-finish molding produced by the mold shown in FIG. 7.
Figure 11:
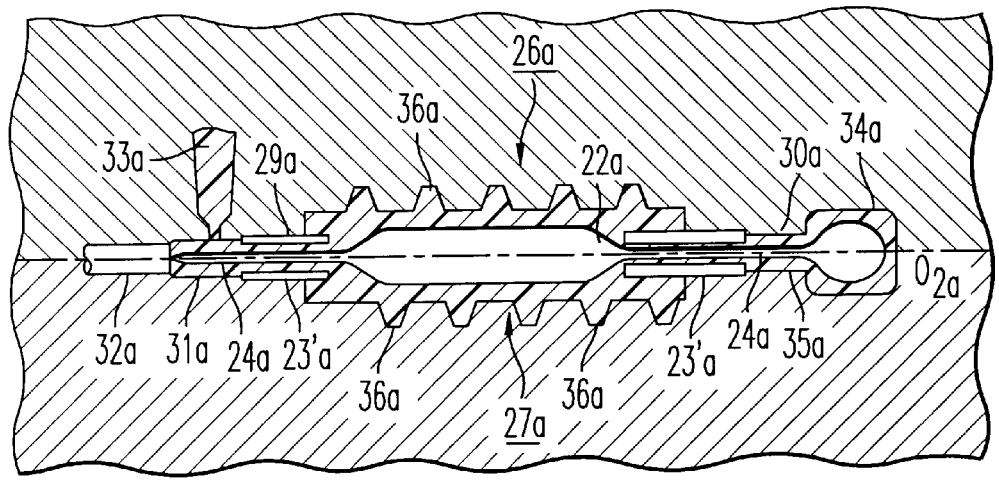
FIG. 11 is a longitudinal sectional view showing an example of a molding process of molding the elongated shaft member including two shaft portions each of which comprises an insert member.
Figure 12:
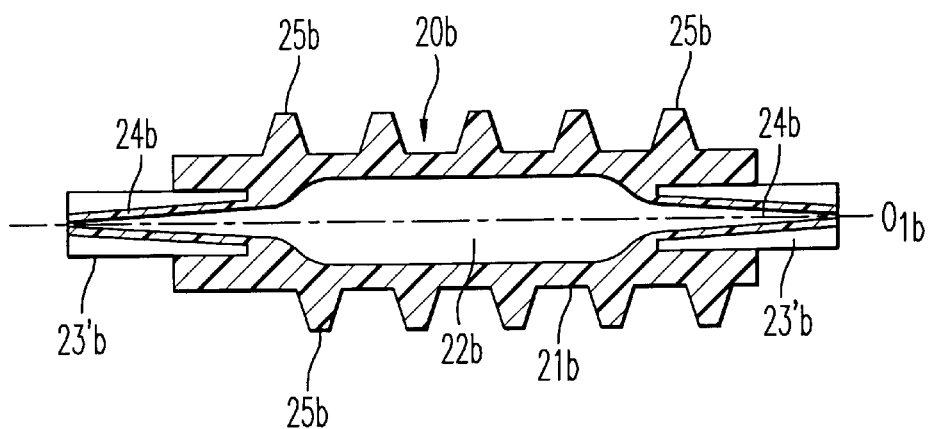
FIG. 12 is a sectional view showing an elongated shaft member according to the present invention, in which two shaft portions each comprise an insert member including a tapered through-hole.
Figure 13:
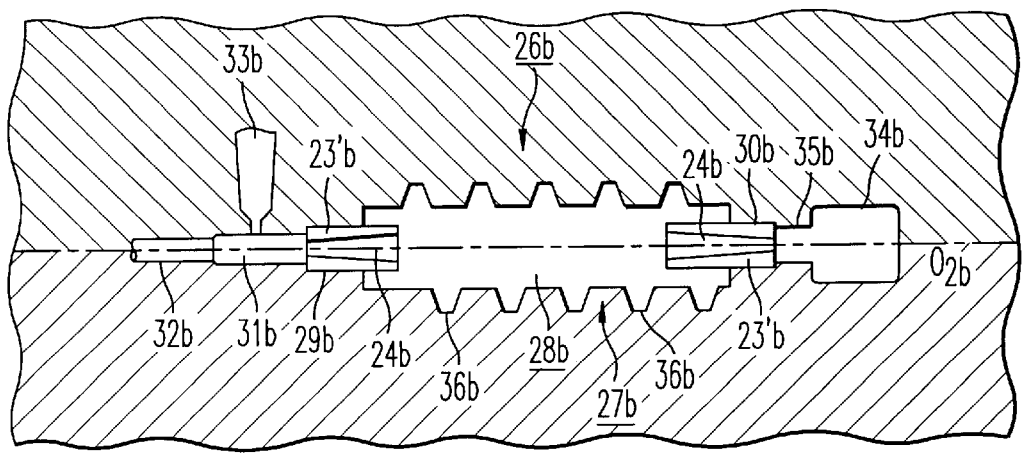
FIG. 13 is a partially longitudinal sectional view showing a mold used for molding the elongated shaft member shown in FIG. 12.

Since the semi-finish molding 20'a taken out of the mold, as shown in FIG. 10, comprises the meat portions 31'a and 35'a and the surplus-meat portion 34'a which are formed integrally therewith, the elongated shaft member 20a shown in FIG. 5 is formed by cutting these meat portions 31'a, 35'a and 34'a. FIG. 11 is an explanatory view showing a case in which the metallic pipe 23'a is inserted into the two ends of the main body cavity 28a so as to mold the elongated shaft member 20a (see FIG. 6). In this case of molding the elongated shaft member 20a shown in FIG. 6, the predetermined amount of molten synthetic resin material is injected into the main body cavity 28a via the through-hole 24a of the metallic pipe 23'a disposed in the first shaft portion cavity 29a. Then, the gas is injected into the main body cavity 28a via the through-hole 24a of the metallic pipe 23'a immediately after or immediately before the injection of the molten synthetic resin material is stopped. The inner wall forming the through-hole 24a of the metallic pipe 23'a disposed in the first shaft portion cavity 29a is covered with the synthetic resin material 4 integrated with the main body 21a. Accordingly, the contact area of the main body 21a with the metallic pipe 23'a at the one end portion of the main body 21a becomes large, and the pulling strength along the axis direction is heightened.

Third Embodiment

FIGS. 12 to 15 show a third embodiment of the elongated shaft member 20b according to the present invention. In FIGS. 12 to 15, each of the two end portions of the shaft portion 23b of the elongated shaft member 20b serves as the metallic pipe 23'b for receiving rotating power, and a diameter of the through-hole 24b of the metallic pipe 23'b becomes continually large from the end surface exposed outside the metallic pipe 23'b to the end surface buried in the main body 21b. That is, the inner peripheral wall forming the through-hole 24b of the metallic pipe 23'b is shaped like a taper.

Figure 14:
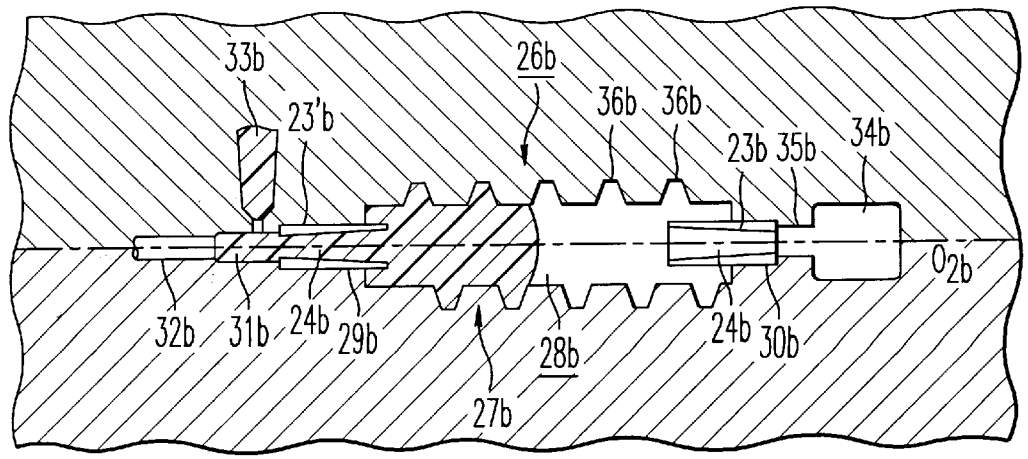
FIG. 14 is a partially sectional view of the mold for the elongated shaft member shown in FIG. 12, showing a state in which molten synthetic resin material is injected into a molding cavity.

In molding the elongated shaft member 20b, as shown in the FIG. 13b, the metallic pipes 23'b having the taper-shaped through-holes 24b are set in the cavities 29b, 30b. Next, as shown in FIG. 14, the molten synthetic resin material 4 is injected into the main body cavity 28b via the taper-shaped through-holes 24b. Since a sectional area of the through-hole 24b becomes large toward the main body cavity 28b, reduction of pressure loss can be obtained in comparison with a case of using the metallic pipe 23'b as shown in FIGS. 4 and 6, and only the given amount of the molten synthetic resin material 4 can be certainly injected into the main body cavity 28b.

Figure 15:
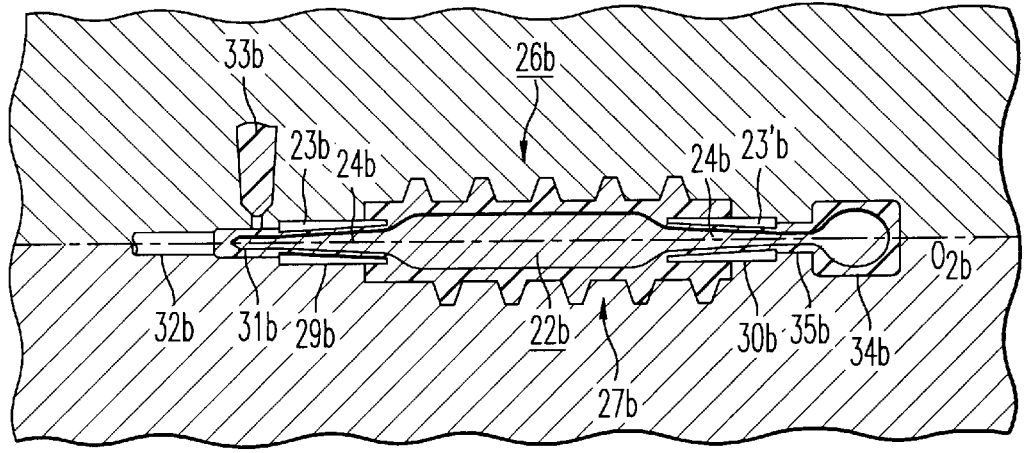
FIG. 15 shows a state in which pressure gas is injected into the molten synthetic resin material shown in FIG. 14 so as to inflate the resin material with the gas.

Next, in FIG. 15, the gas is injected from the direction of the center axis O2b, and the molten synthetic resin material 4 is carried throughout the main body cavity 28b. Since the sectional area of the through-hole 24b becomes large toward the main body cavity 28b even if the gas is injected into, the reduction of the pressure loss can be obtained and the gas can be injected into the main body cavity 28b with little gas loss. That is, since the gas is injected into and spreads toward the main body cavity 28b, the gas can smoothly flow into the main body cavity 28b.

As for the metallic pipe 23'b set in the cavity 30b existing at the other end portion of the main body cavity 28b, the sectional area of the through-hole 24b becomes narrow from the main body cavity 28b to the surplus-resin receiving cavity 34b, and therefore pressure when the molten synthetic resin material is pressed into the surplus-resin receiving cavity 34b, becomes large. Thereby, the surplus of the molten synthetic resin material can be smoothly moved into the surplus-resin receiving cavity 34b.

In this embodiment, the metallic pipes 23'b as the shaft portions, having the taper-shaped through-holes 24b, are mounted on two sides of the main body 21b. However, the metallic pipe 23'b as one shaft portion may be mounted only on one side of the main body 21b, and the other shaft portion mounted on the other side may be made of synthetic resin.

Fourth Embodiment

Figure 19:
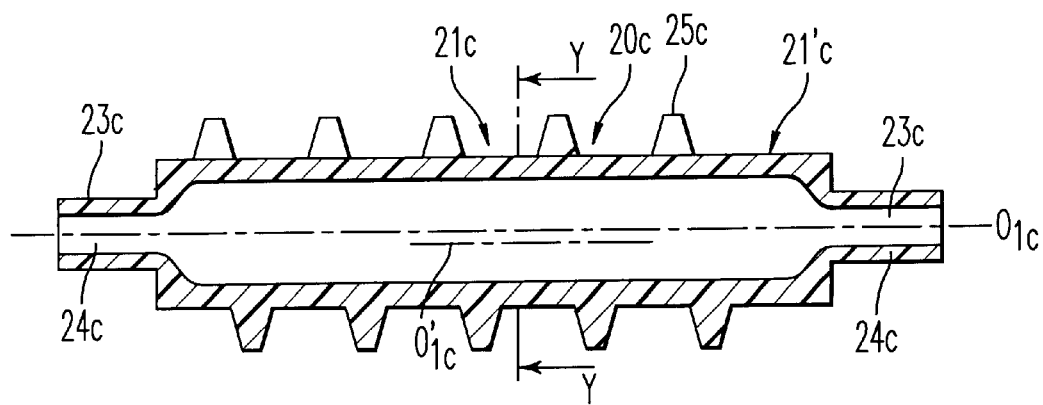
FIG. 19 is a longitudinal sectional view showing an elongated shaft member in which projections asymmetric in rotation in a circumferential direction thereof and a thickness part of the elongated shaft member is not cut off.
Figure 20:
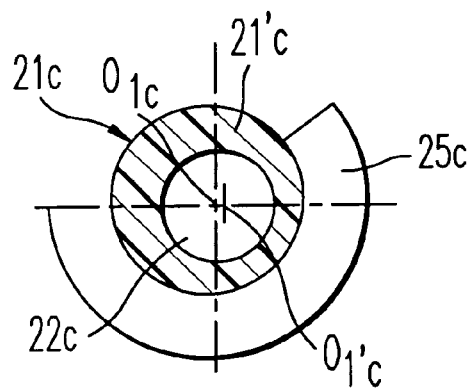
FIG. 20 is a sectional view along line Y—Y of FIG. 19.

FIGS. 19 to 20 show the elongated shaft member 20c in which the spiral projection portions 25c are formed along a longitudinal direction on an outer periphery of the main body 21c and are asymmetrical in a circumferential direction about the center axis O1c. In a this elongated shaft member 20c, as shown in FIG. 19, a center O1'c of the hollow portion 22c is displaced from the center axis O1c of the main body 21c on which a the projection portions 25c are formed. As shown in FIG. 20, there is a tendency for a part 21'c of the main body 21c having no projection to become thick. The reason is that the molten synthetic resin material 4 existing on the sides of the projection portions is so much that it is difficult to be cooled and hardened. For this reason, the main body 21c is bowed and the elongated shaft member 20c is curved.

Figure 16:
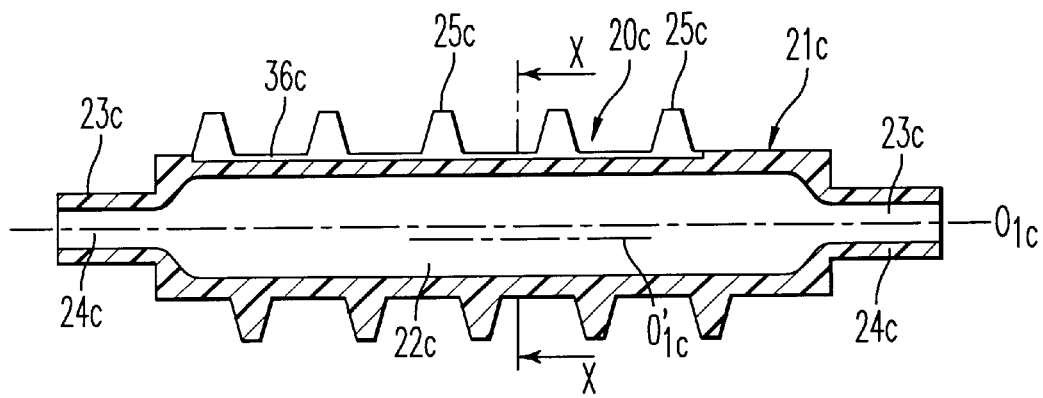
FIG. 16 is a longitudinal sectional view showing an elongated shaft member according to another embodiment of the present invention, in which projections asymmetric in rotation in a circumferential direction of the elongated shaft member are formed and a thickness part of the elongated shaft member is cut off.
Figure 17:
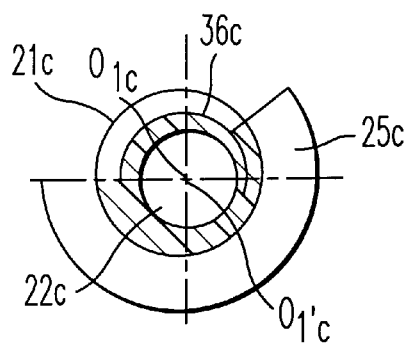
FIG. 17 is sectional view along line X—X of FIG. 16.

As shown in FIGS. 16 to 18, a meat-cut portion 36c is formed from one side to the other side of a projection-forming area 21Ac, in a longitudinal direction on the outer peripheral surface of the main body 21c on which the projection portions 25c are formed. Thereby, the center of the contour of the main body 21c is separated away from the center axis O1c so that the center O1'c of the hollow portion 22c can be coincident with the center of the contour of the main body 21c on which the projection portions 25c are formed.

Thus, if the meat-cut portion 36c is formed from one side to the other side of the main body 21c on which a plurality of the asymmetrical projection portions 25c are formed, a straight elongated shaft member 20c can be molded because the meat-thickness of the main body 21c is uniform from one side to the other side of the main body 21c at places on which the asymmetrical projection portions 25c are formed.

That is, in the projection forming area 21Ac, with given intervals in the longitudinal direction, a projection forming portion 21Bc exist within a given angle range at the circumference, and non-projection forming portions as the parts 21 without projection place 21'c exist outside the given angle range. Accordingly, in the non-projection forming portion of the area 21Ac, if the meat-cut portion 36c, which has an outer peripheral surface lower than that of a base portion of the projection forming portion 21Bc, formed a sectional meat-thickness of the non-projection forming portion is substantially the same as that of the projection forming portion.

Fifth Embodiment

FIG. 21 is a schematic view showing a total constitution of an apparatus for molding the elongated shaft member 20d according to the present invention.

Figure 22:
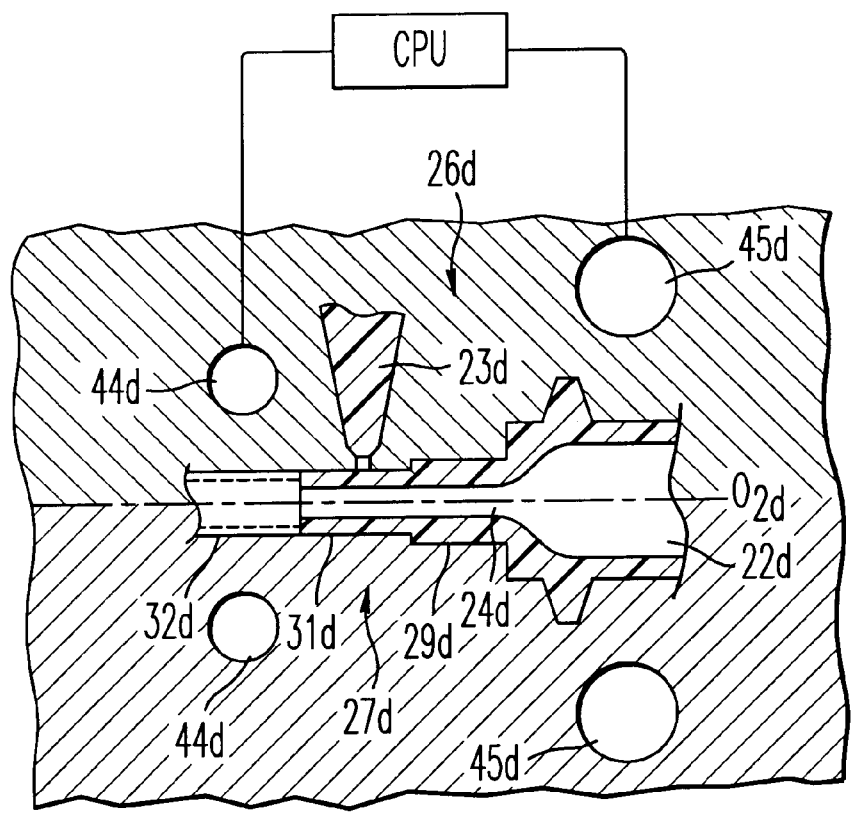
FIG. 22 is a partially enlarged view of the mold shown FIG. 21 showing water-cooled passages.

In FIG. 21, reference numeral 40d denotes an injection molding machine body (resin filling device or resin filling means). The body 40d comprises a hopper 41d in which solid pellet 42d is stored. The pellets 42d are supplied by a given quantity unit to a pressuring and melting chamber 42bd of a cylinder 42ad and is changed into molten synthetic resin material 4' by means of a screw rod 42cd. The molten synthetic resin material 4' is led to the resin injection portion 31d through resin-injecting passages 43d and 33d of the stationary mold 26d. As shown in FIG. 22, a water-cooled passage (temperature controlling member) 44d for controlling a temperature in the vicinity of the gas nozzle 32 and water-cooled passage 45d for regulating a temperature of the main body cavity 28 are formed around molds 26d and 27d near the gas nozzle 32d and a mold near the main body cavity 28d. A temperature of cold water supplied to the passage 44d is set at 50° and a temperature of cold water supplied to the passage 45d is set at 10°. Thereby, a cooled temperature around the molds 26d and 27d near the gas nozzle 32d is set higher than that around the mold near the main body cavity 28d. Temperatures of these temperature controlling members are controlled by a later-mentioned temperature controlling means 40Bd, 40Cd.

Reasons will be given hereinafter.

The molten synthetic resin material 4 is cooled by being contacted with the inner peripheral wall of the main body cavity 28d. However, the resin material 4 is supplied with gas in its central portion and cannot be compulsorily cooled. For this reason, if the resin material 4 is cooled only dependenting on contact with the inner peripheral wall of the main body cavity 28d, the cooling time becomes longer and molding cost of the elongated shaft member 20d becomes higher. Therefore. in general, by using a chiller to compulsorily cool a mold, a molding cycle can be shortened.

However, if the temperature around the molds near the gas nozzle 32d is cooled to be the same as the cooled temperature around the mold near the main body cavity 28d, hardening goes so fast by the cooling of the resin material 4 that the resin material 4 cannot be inflated and the hollow portion cannot be formed in the resin material 4, even if the pressure gas is injected into.

Thus, in order to control the hardening speed of the resin material 4 near the nozzle 32d and obtain the shortening of the molding cycle of the elongated shaft member 20d, the cooled temperature around the molds 26d and 27d near the nozzle 32d is set higher than that around the mold near the main body cavity 28d.

The reason why the temperature of the cold water supplied to the water-cooled passage 45d is set at 10°, is that, if the mold is cooled in a temperature lower than 10°, the cooling and hardening of the resin material 4 goes so fast so that the resin material 4 is stopped moving before reaching the surplus-resin receiving cavity 34d, and a well shaped elongated shaft member 20d cannot be obtained.

The reason why a temperature of the cool water supplied to the cool water passage 44d is set at 50°, is that if the mold is cooled in a temperature lower than 50°, the cooling and hardening of the resin material 4 goes too fast so that the resin material 4 cannot be inflated and the pressure gas is difficult to be injected into the main body cavity 28d, even if the gas is injected. On the other hand, if the mold is cooled in a temperature higher than the given temperature, a temperature of the mold near the gas nozzle 32d is so high that fluidity of the resin material 4 becomes large. Accordingly, when the gas is injected into, the resin material 4 is blown off by the injection of the gas. Therefore, the temperature of the resin material 4 near the gas nozzle 32d is set at 50° which is higher than that of a glass transition point and in which the blowing off will not happen by the gas injection.

A CPU controls starting and ending the injection and filling of resin material on every molding cycle, sending cold water to the injection molding machine body 40d and water-cooled passages 44d and 45d, injecting gas to the main body cavity 28d, and degassing the main body cavity 28d. The CPU controls these operations by interlocking with the opening and closing of the mold.

Figure 23:
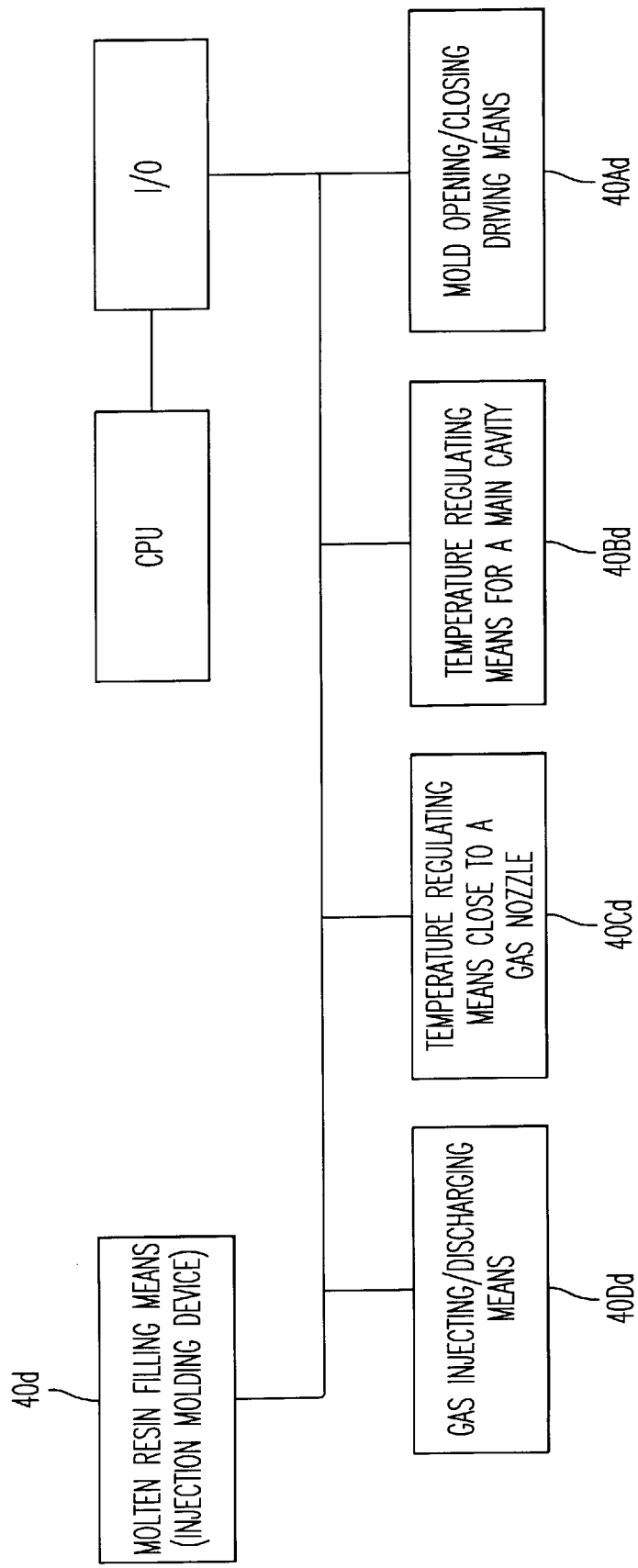
FIG. 23 is a block diagram showing a relationship between a CPU and each of control means.

That is, the CPU, as shown in FIG. 23, via an input-output interface, controls the injection molding machine body 40d, mold driving means 40Ad, temperature controlling means 40Bd and 40Cd, and gas injecting and degassing means (medium injecting device) 40Dd.

In addition, the temperature controlling means (temperature controlling device) 40Bd and 40Cd are actuated at least until the hollow forming medium passes through the resin on the melt filled in the first shaft portion cavity 29d and is injected into the molten resin 4 filled in the main body cavity 28d.

Sixth Embodiment

A description of a method for molding the elongated shaft member 20e by means of this molding machine will be given hereinafter.

This sixth embodiment illustrates a case of molding the elongated shaft member 20 shown in FIG. 5. However, the molding of the elongated shaft members 20a, 20b shown in FIGS. 1, 4, 6, and 12 can also be applied to this embodiment.

Figure 24A:
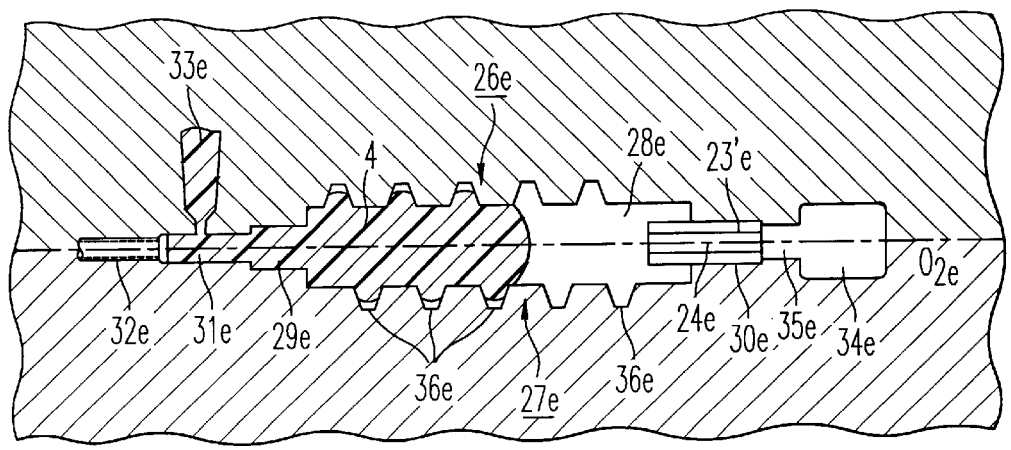
FIGS. 24(*a*) to 24(*e*) are explanatory views showing a molding method of molding an elongated shaft member according to the present invention.
Figure 25:
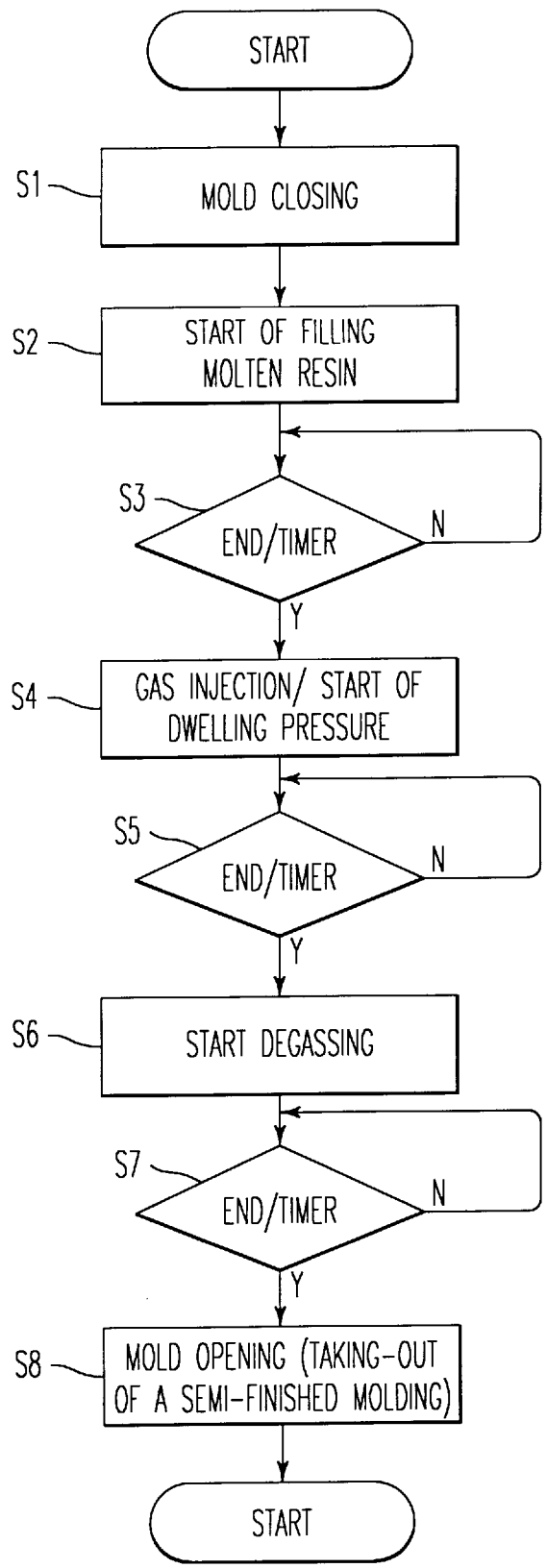
FIG. 25 is a flow chart showing steps of a molding method of molding the elongated shaft member.

First, as shown in FIG. 24(a), the metallic pipe 23'e is set in a mold and the mold is closed (see step S1 of FIG. 25). Next, the molten synthetic resin material 4 is injected into the main body cavity 28e by given pressure (see steps S2, S3 of FIG. 25). That is, the resin material 4 is injected by short shot.

As the resin material 4, for example, ABS is used. If a viscosity of the resin material 4 is too low, a lump of the resin material 4 is broken by pressure gas, and the pressure gas leaks from the cavity 28e and thereby a well-shaped semi-finish molding 20'e cannot be obtained. On the other hand, if a viscosity of the resin material 4 is too high, the resin material 4 cannot be smoothly inflated by the pressure gas, and a well hollow-shaped semi-finish molding 20'e cannot obtained. Further, it is needed to consider rigidity of the elongated shaft member 20'e as a finished molding. Herein, glass fiber is mixed in the ABS resin, and the glass fiber content of the ABC resin is 30e weight percentage. The average length of the glass fiber is 3 mm and average diameter is 13 μm.

Valuation of moldability (ASTM) is performed by using ABC resins with different viscosities, and the valued results are as follows.

Herein, a comparison is performed between an ABC resin product called NC411-G30 produced by Techno Polymer Co. and a ABC resin product called NC100-G30. The glass fiber content of each of them is 30 weight percentage. The product NC411-G30 is 12.0 g/min and is high in viscosity on condition that the melt flow rate is 220° and 98N. On the other hand, the product NC100-G30 is 40.0 g/min and is low in viscosity on condition that the melt flow rate is 220° and 98N.

After the molding experiment about the two kinds of ABS resins was performed, unevenness in thickness was found in the ABS resin with a high viscosity of the resin material 4 and not in that with a low one of the resin material 4.

As shown in FIG. 26(a), if the viscosity of the resin material 4 is high, a gas flowing direction is curved from the center axis O2e near the resin injecting portion 31e. On the other hand, as shown in FIG. 26(b), if the viscosity of the resin material 4 is low, gas pressure overcomes the viscosity of the resin material 4 and the gas flowing direction becomes parallel with the center axis O2e.

A temperature of the resin material 4 is, for example, 240°. It is preferable that injection volume of the rest material 4 is 70% of the volume of the main body cavity 28e. It is required at least that the total of a filling amount of resin injected by the molten resin filling device and an injection amount of hollow-forming medium injected by the medium injecting device, is bigger than the total of volume of the main body cavity 28e formed in the mold and volume of the first and second shaft portion cavities 29c and 30e.

Figure 24B:
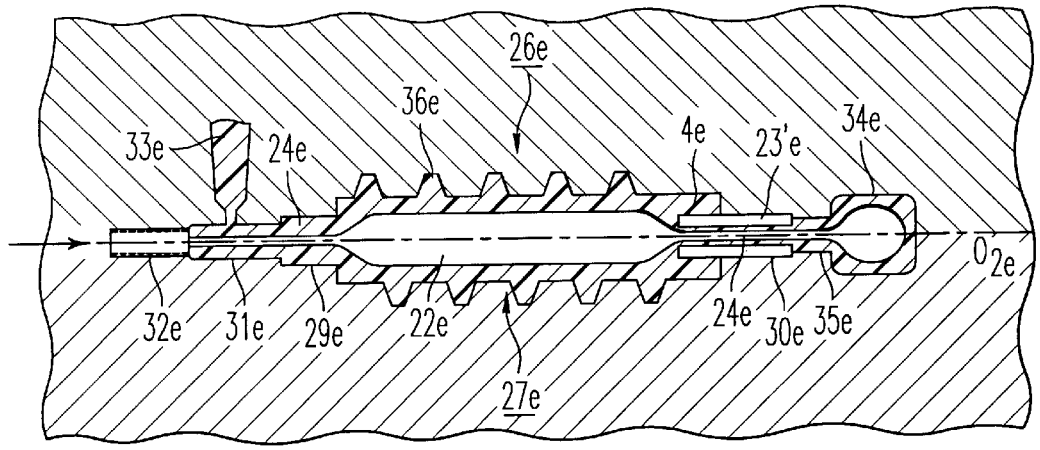

Next, as shown in FIG. 24(b), immediately before or immediately after the injection of the resin material 4 is stopped, the gas is injected into the cavity 31e from a direction of the center axis O2e. The resin material 4 is inflated and moved toward the cavity 34e so that the resin material 4 spreads throughout the inner surface of the cavity 28e. By the gas injection from the direction of the center axis O2e, the hollow portion 22e is formed extending in the direction of the center axis O2e. A surplus of the resin material 4 is led to the cavity 34e, and thereby the variation of hollow rate is absorbed.

The gas pressure can be selected among 50 to 300 kg/cm2, and in this embodiment, the injection is carried out in a pressure of 110 kg/cm2. If the gas pressure is too low, a semi-finish molding 20'e with a sufficient hollow shape cannot be obtained. If too high, the pressure gas breaks the resin material 4 and leaks from the cavity 28e, and thereby a well-shaped semi-finish molding 20'e cannot be obtained. It is desired to apply a pressure of about 110 kg/cm2.

Then, the gas pressure is kept unchanged for a given time. Thereby, the resin material 4 is cooled and hardened throughout the inner surface of the cavity 28e (see steps S4 and S5 of FIG. 25). Herein, a pressure maintaining time of the gas is set at 40 seconds in view of a guarantee of dimensional accuracy of the elongated shaft member 20e and a reduction of the molding cycle. The semi-finish molding 20'e is needed to be cooled and hardened in the mold until, at least, a temperature of a surface of the molding 20'e is dropped under that of the glass transition point so that when the molding 20'e is ejected from the mold, the molding 20' is not deformed by shrinkage after taken out from the mold.

That is, the relation between the pressure maintaining time of the gas and the dimensional accuracy of the semi-finish molding 20'e is shown by a graph in FIG. 27(a). In FIG. 27(a), an axis of abscissa designates the pressure maintaining time of the gas and an axis of ordinate designates the dimensional accuracy of the elongated shaft member 20e. Herein, as the dimensional accuracy of the shaft member 20e, rotation deflection of the shaft member 20e is used.

That is, on the basis of the first and second shaft portions 23e, a needle is contacted with the outer peripheral surface of the main body 21e and the maximum of variation of the needle is measured when the elongated shaft member 20e is rotated at one time.

In FIG. 27(a), reference character Q0 denotes a characteristic curve showing the relation between the pressure maintaining time of the gas and the dimensional accuracy of the semi-finish molding 20'e. In an area Q1 where the pressure maintaining time is short, since the cooling and hardening of the resin material 4 is not sufficient, when the semi-finish molding 20'e is taken out from the mold, the molding 20'e is largely deformed by the cooling and hardening of the resin material 4, and the dimensional accuracy of the molding 20'e decreases As shown in FIG. 27(b), part of molten synthetic resin material which is not cooled and hardened within the cavity 28e near the gas nozzle 32e, is absorbed toward the gas nozzle 32e by a wind-pressure caused during later-mentioned degassing, and thereby the gas nozzle 32e may be choked.

On the other hand, in an area Q2 where the pressure maintaining time is long, the dimensional accuracy of the shaft member 20e increases. However, sticking to the mold becomes large by the shrinkage of the semi-finish molding, and deformation occurs when the semi-finish molding 20'e is taken out. Accordingly, the molding 20'e may be broken when taken out.

Accordingly, the gas pressure maintaining time within the hollow portion 22e is decided in view of the hardening progress of the molten synthetic resin material and dimensional accuracy of the elongated shaft member 20e.

Figure 28A:
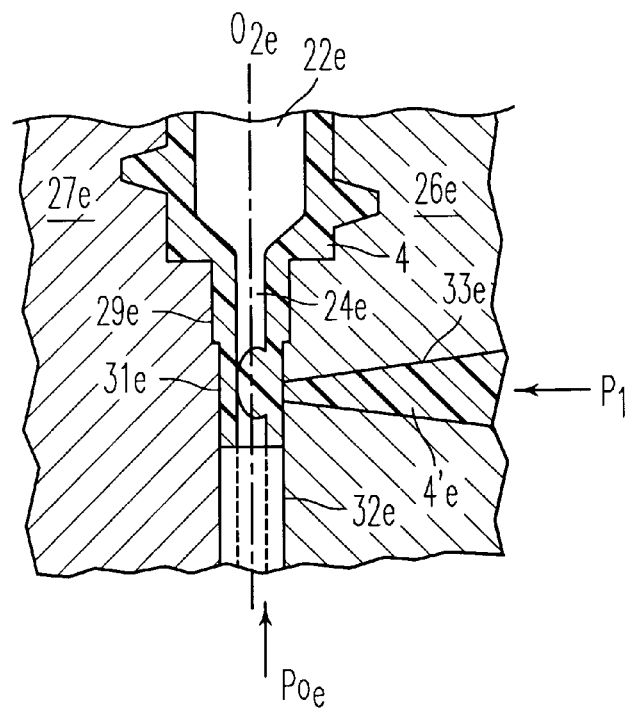
FIGS. 28(*a*) and 28(*b*) are enlarged views of a part in the vicinity of the gas nozzle of the mold, showing a relationship between back pressure applied to the molten synthetic resin material of a molding apparatus body and dwelling pressure of the pressure gas.
Figure 28B:
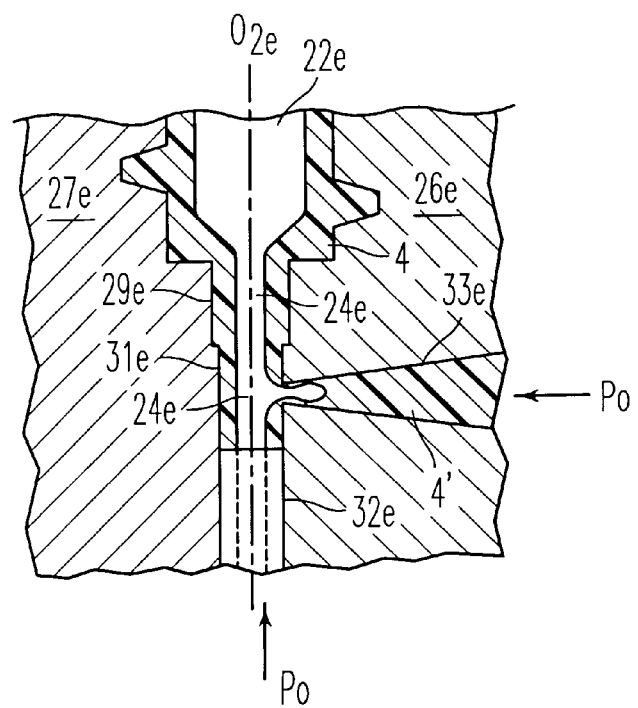

In addition, while the gas pressure is kept unchanged, in order to produce a next semi-finish molding, the pellet 42e is measured. At this time, in order to improve the measurement accuracy, back pressure (to such an extent that resin material is stopped in the injecting passage 33e of the resin injection portion 31e) is measured while being applied by the screw rod 42ce to the resin material 4 stored in the pressuring and melting chamber 42be of the machine body 40e. If the back pressure P0 is higher than a kept unchanged pressure P1 of the gas, as shown in the FIG. 28(a), part of the resin material 4' existing in the resin injecting passage leaks from the cavity 31e and thereby part of the through-hole 24e is choked. Accordingly, the kept unchanged pressure P1 is set higher than the back pressure P0. Thus, if the maintaining pressure P1 of the gas is set higher than the back pressure P0, as shown in FIG. 28(b), the resin material 4' existing in the resin injecting passage is pressed into the passage 33e, and thereby the through-hole 24c can be prevented from being choked. The stopping pressure is controlled by the CPU (a control device).

That is, an injecting pressure of the medium injecting device 40De is also controlled by the CPU. The pressure P1 is also higher than the stopping pressure P0. It is desired that the operation of the medium injecting device becomes performed until the inner surface of the resin material 4 is stable.

The stability of the inner surface of the resin material 4 is decided when a temperature of the inner surface of the resin material existing in a place where molten resin material existing in the cavity 29e is communicated with that existing in the body cavity, is below a softening point.

Figure 24C:
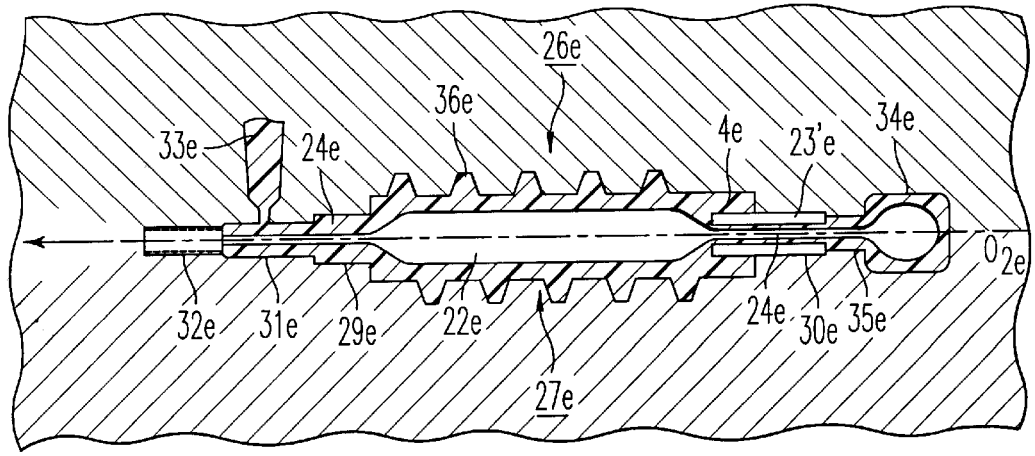
Figure 24D:
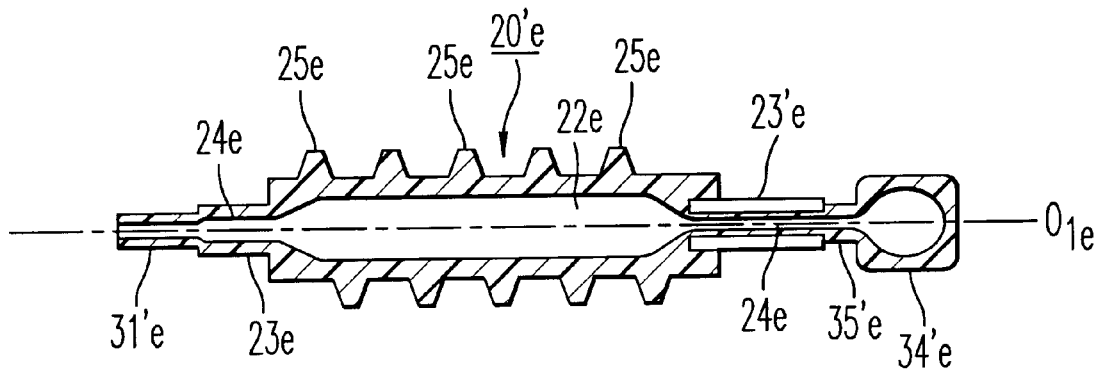
Figure 24E:
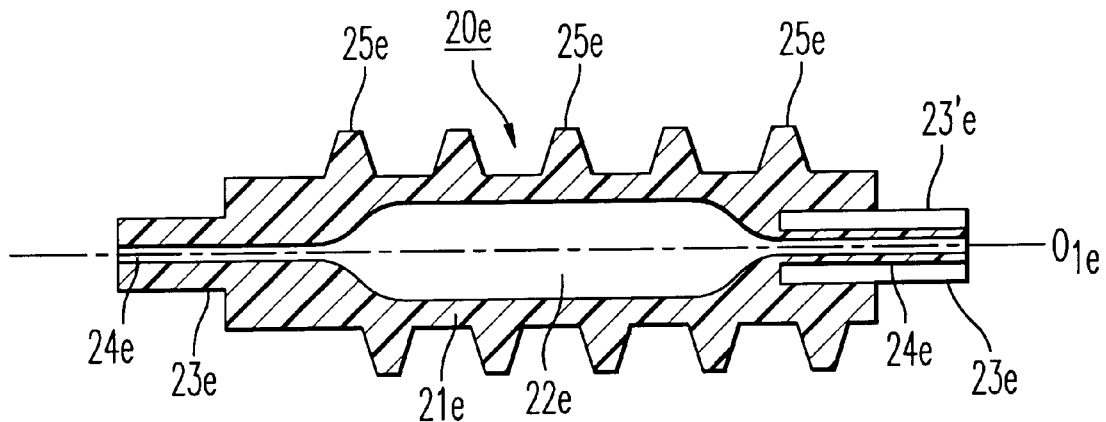

Next, as shown in FIG. 24(c), since gas pressure within the hollow portion 22e is largely higher than outside pressure, gas stored within the hollow portion 22e of the semi-finish molding 20'e cooled and hardened within the mold is removed from the nozzle 32e (see S6 and S7 of FIG. 25). The medium injecting device 40De functions as a degassing device of the gas.

Then, the semi-finish molding 20'e is taken out from the mold (see S8 of FIG. 25).

Next, as shown in FIG. 23(d), the elongated shaft member 20e as shown in FIG. 23(e) is completed by cutting unnecessary parts of the semi-finish molding 20'c.

Seventh Embodiment

Figure 29:
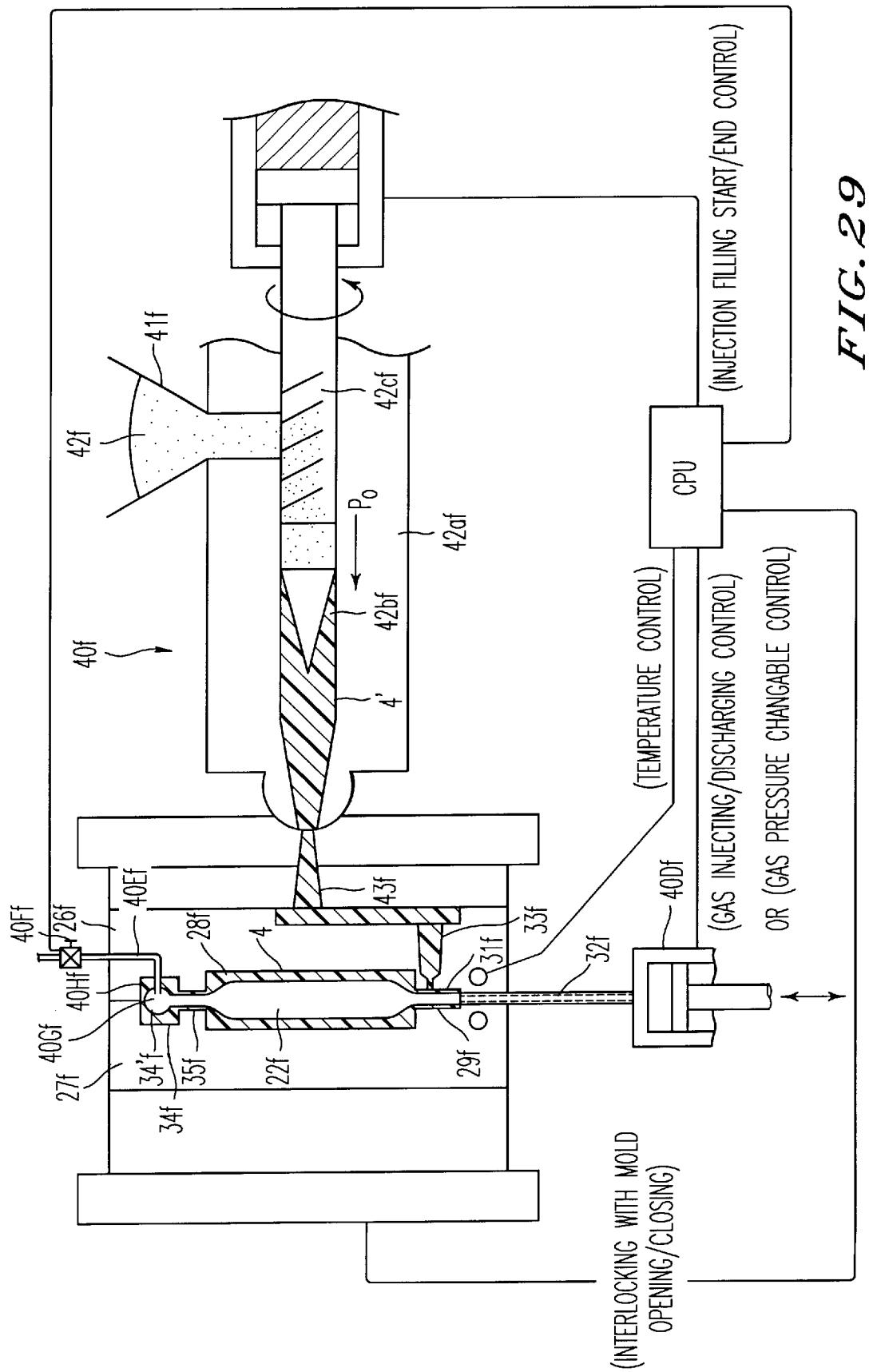
FIGS. 29 to 31 show another embodiment of a method and apparatus for molding an elongated shaft member according to the present invention.
Figure 30:
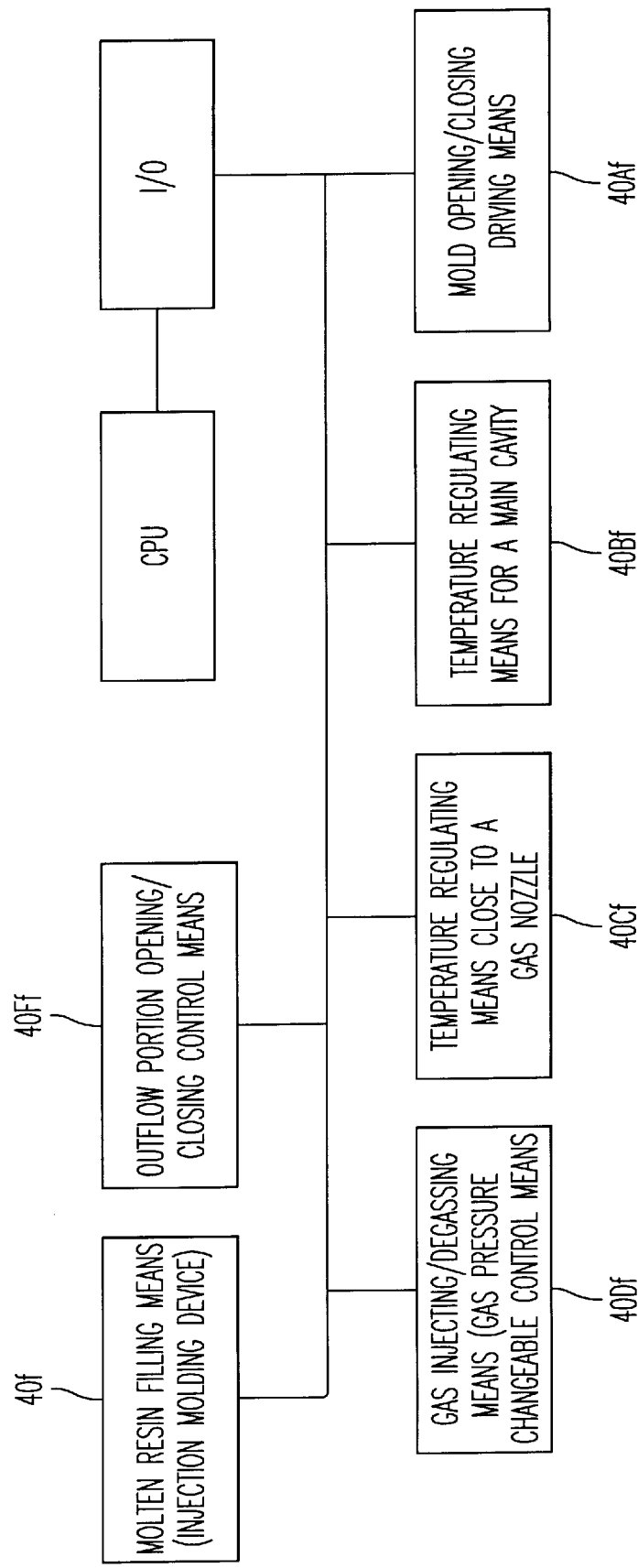

FIGS. 29 to 31 show another embodiment of an apparatus and a method both for molding the elongated shaft member according to the present invention.

In this embodiment, a hollow-forming medium outflow portion (hole or pipe) 40Ef is mounted in an inner wall of cavity 34f in the stationary mold 26f. The reason why the outflow portion 40Ef is mounted in the stationary mold 26f is that this arrangement makes a constitution of the present invention simple.

A front end 40G of the outflow portion 40E may be arranged projecting into a hollow 34'f of the cavity 34'f. On the way of the outflow portion 40Ef, an open-and-close valve (outflow portion open-and-close control means) 40Ff is mounted. The open-and-close valve 40F is controlled by the CPU, in order to allow the hollow 34'f to have a desired size. In order that the gas is prohibited from flowing out from the outflow portion 40Ef for a given time, the open-and-close valve 40Ff is closed. In a case in which the front end 40Gf of the outflow portion 40Ef is on the same level with an inner wall surface of the cavity 34f, the CUP may be set to open the valve 40Ff when the resin 4 is hardened so much that the gas cannot break the resin 4 by the gas pressure and cannot leak from the outflow portion 40Ef.

In this embodiment, the gas is allowed to flow out from a direction orthogonal to the gas-injecting direction. However, the hollow-forming medium outflow portion 40Ef may be opened in an inner surface 40Hf which is in the deepest portion of the gas-injecting direction in the cavity 34f. When the molten resin spreads on the inner surface of the cavities 28f, 29F and 30f, a well-shaped semi-finish molding 20'f is completed, and the inner surface of the resin on the melt reaches a desired hardening state, the gas pressure within the hollow portion 22f is increased by the gas injecting/degassing means, so that the gas breaks the resin filled into the cavity 34f and is allowed to flow out from the outflow portion 40Ef.

Figure 31A:
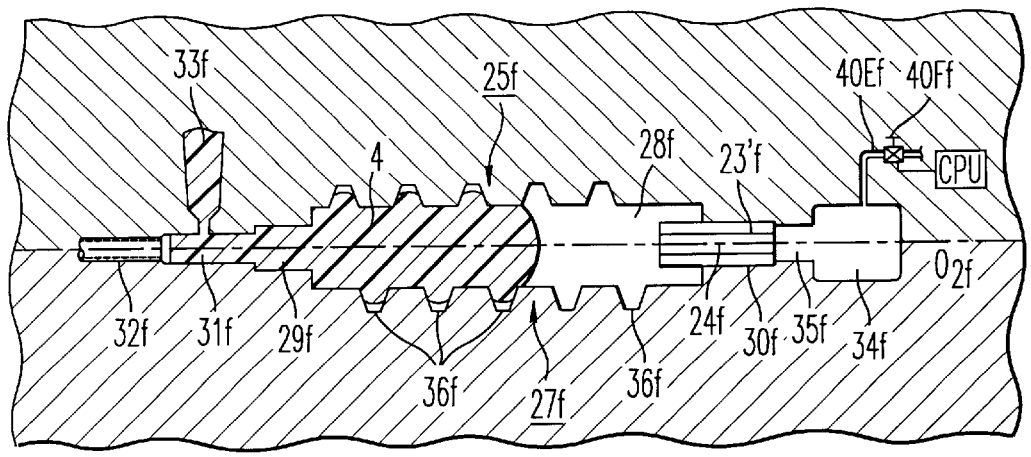

In the molding method according to this embodiment, as shown in FIG. 31(a), it is preferable that the resin on the melt 4 is injected into the cavity in a state in which the valve 40Ff is opened by the CPU. But the resin 4 may be injected into the cavity in a state in that the valve 40Ff is closed.

Figure 31B:
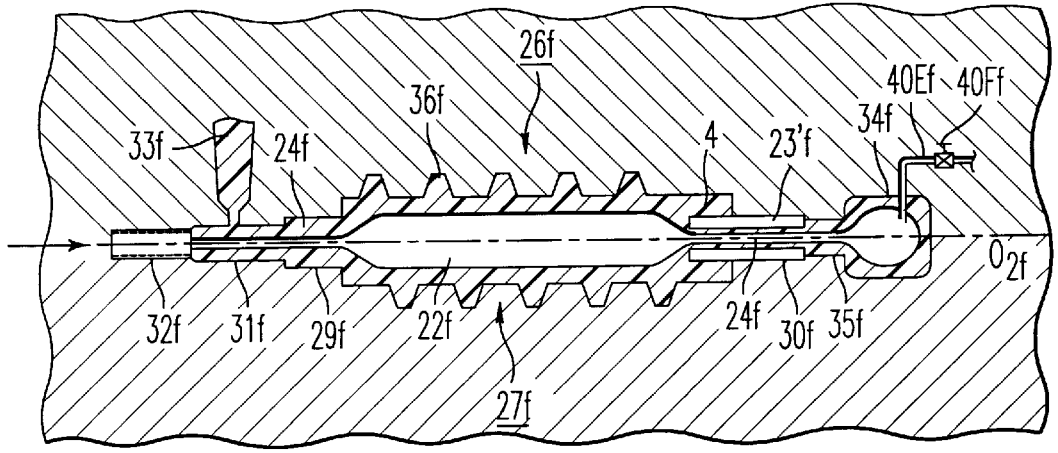
Figure 31C:
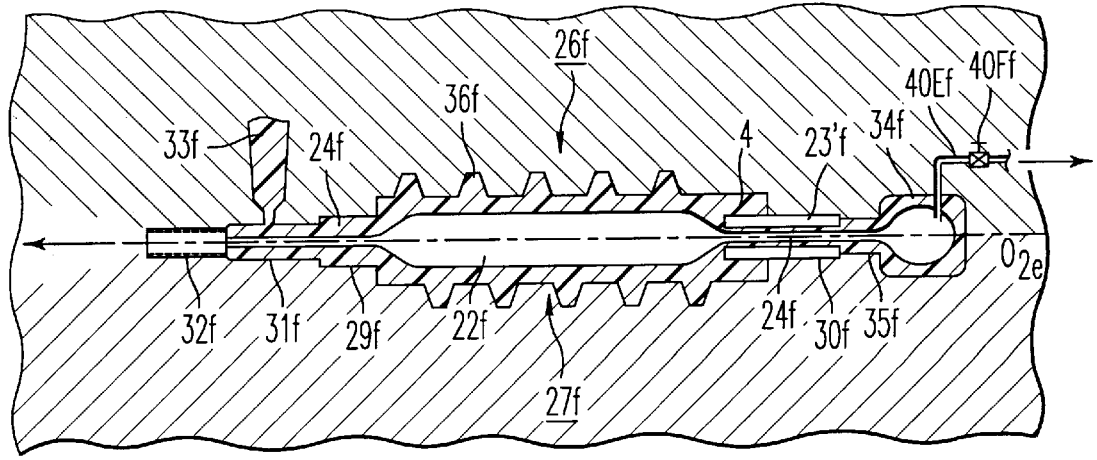
Figure 31D:
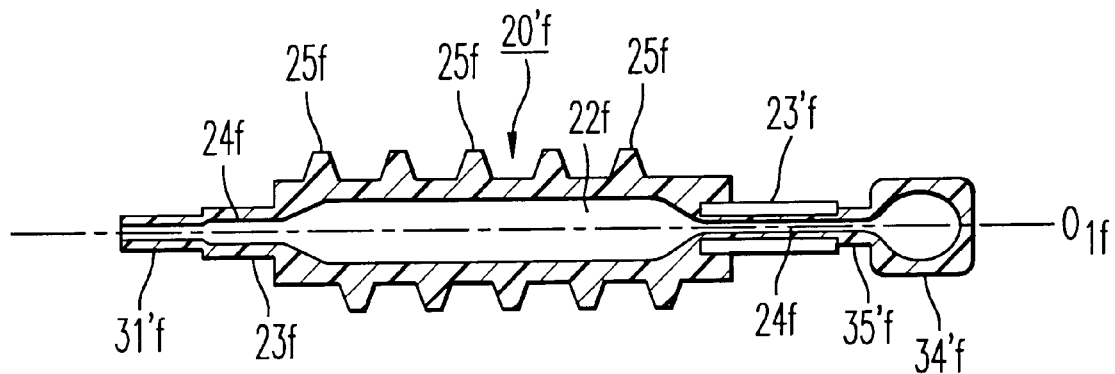
Figure 31E:
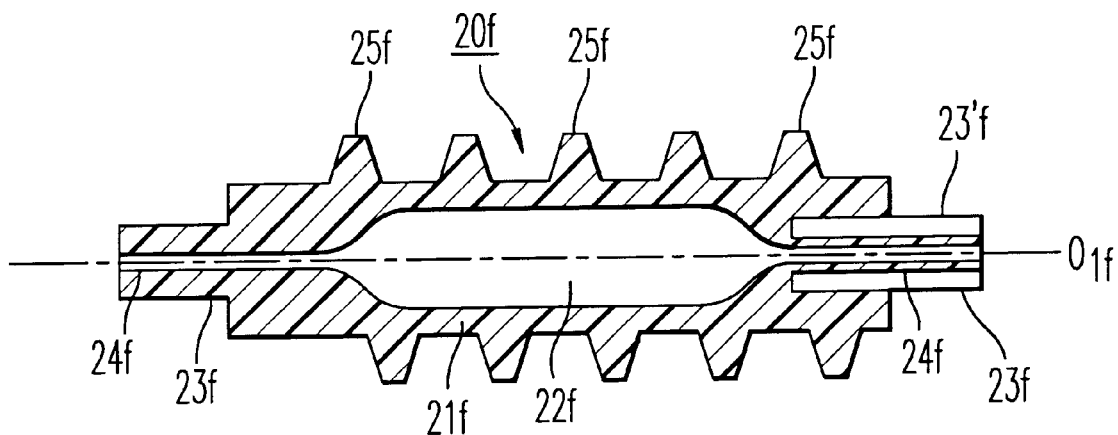
Figure 32:
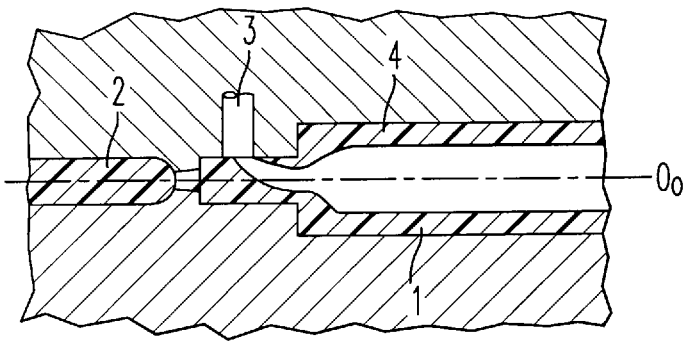
FIG. 32 is a partially sectional view showing a process of molding an elongated shaft member by the use of a conventional mold for molding an elongated shaft member.
Figure 33:
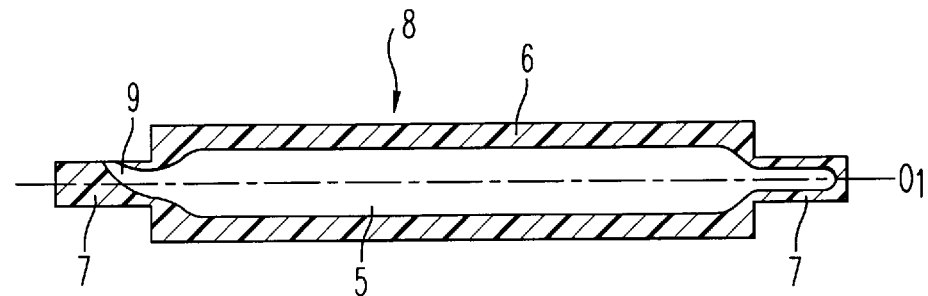
FIG. 33 is a sectional view showing an elongated shaft member molded by the conventional mold.
Figure 34:
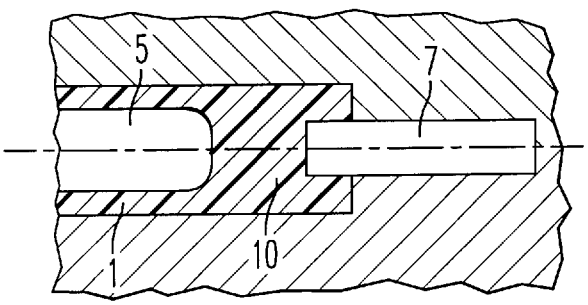
FIG. 34 is a partially sectional view showing a process of molding an elongated shaft member in which an insert member is inserted into an end thereof by the use of the conventional mold.
Figure 35:
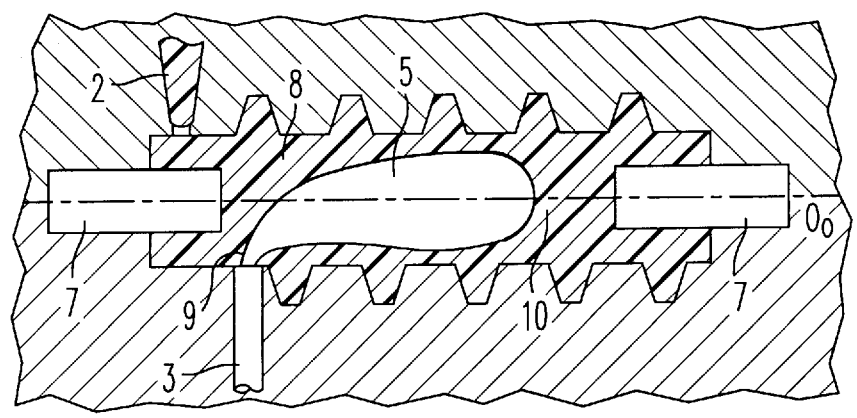
FIG. 35 is a partially sectional view showing a process of molding an elongated shaft member in which insert members are inserted into both ends thereof, respectively, by the use of the conventional mold.

Next, as shown in FIG. 31(b), the valve 40Ff is closed by the CPU and the pressure gas is injected into the resin in the cavity. Since the outflow portion 40Ef is closed by the valve 40Ff, the gas is prevented from flowing out from the outflow portion 40Ef and a desired shape of the semi-finish molding can be obtained. Then, after a given time, as shown in FIG. 31(c), the valve is opened by the CPU. Thereby, the gas flows out from the outflow portion 40Ef. The remaining processes (FIGS. 31(d), (e)) are the same as the aforementioned process, and therefore, descriptions thereof are omitted.

What is claimed is:

1. An elongated shaft member made from synthetic resin material, said elongated shaft member comprising:
   an elongated hollow portion, formed inside of said elongated shaft member, extending in a direction of an axis substantially coaxial with a center axis of said elongated shaft member;
   through-holes formed at ends of said elongated shaft member in a direction in which said elongated hollow portion extends, respectively, through which said elongated hollow portion communicated with an outside, said through-holes being substantially coaxial with said center axis; and
   wherein said elongated shaft member is formed of a homogenous monolithic-resinous structure.

2. An elongated shaft member wherein, as a result of injecting a hollow-portion forming medium into molten resin from medium injecting means, there are formed a hollow portion extending along an axis substantially coaxial with a center axis of said elongated shaft member, first and second shaft portions formed at ends of said hollow portion, said first and second shaft portions being smaller in diameter than a middle portion of said elongated shaft member, and through-holes, formed in said first and second shaft portions respectively, through which said elongated hollow portion communicates with an outside;
   wherein said elongated shaft member is formed of a homogenous monolithic-resinous structure.

3. An elongated shaft member comprising:
   a main body made from injection molding a synthetic resin material;
   an elongated hollow portion, formed inside of said main body, extending in a direction of an axis substantially coaxial with a center axis of said main body;
   first and second shaft portions formed at ends of said main body respectively, said first and second shaft portions being smaller in diameter than said main body;
   through-holes formed in said first and second shaft portions respectively, through which said elongated hollow portion communicates with an outside; said through-holes being substantially coaxial with the center axis of said main body; and wherein at least one of said first and second shaft portion is constructed of an insert member inserted in at least one of the ends of said main body, said insert member being made from a material different from said synthetic resin material, and said through-holes formed in said insert member;

wherein said elongated shaft member is formed of a homogenous monolithic-resinous structure.

4. The elongated shaft member of claim 3, wherein said insert member is made from metallic material.

5. The elongated shaft member of claim 3, wherein said through-hole becomes gradually larger in diameter from an end of said insert member which is exposed to the outside to the other end of said insert member which is buried in said main body.

6. The elongated shaft member of claim 3, wherein an inner surface of said insert member which constitutes said through-hole is covered with said synthetic resin material from which said main body is made.

7. An elongated shaft member made from synthetic resin material, said elongated shaft member comprising:

an elongated hollow portion, formed inside of said elongated shaft member, extending in a direction of an axis substantially coaxial with a center axis of said elongated shaft member;

through-holes formed at ends of said elongated shaft member in a direction in which said-elongated hollow portion extends, respectively, through which said elongated hollow portion communicates with an outside, said through-holes being substantially coaxial with said center axis; and a plurality of projections, formed on an outer circumferential surface of said main body, spiraling in a longitudinal direction of said main body at intervals.

8. The elongated shaft member of claim 7, wherein said elongated shaft member is formed by injection molding liquid resin.

9. An elongated shaft member comprising:

a main body made from synthetic resin material;

an elongated hollow portion, formed inside of said main body, extending in a direction in which a center axis of said elongated shaft member extends;

shaft portions formed at ends of said main body respectively, said shaft portions being smaller in diameter than said main body;

through-holes formed in said shaft portions respectively, through which said elongated hollow portion communicates with an outside, said through-holes being substantially coaxial with said center axis; and a longitudinal projection forming area on an outer circumferential surface of said main body, for forming a plurality of spiral projections at intervals in a longitudinal direction of said main body, said longitudinal projection forming area having a projection forming area part within a predetermined angle in a circumferential direction of said main body and a projection non-forming area part within a remaining angle excluding said predetermined angle, said projection non-forming area part having an outer surface radially lower than the outer surface of said projection forming area part so that said projection non-forming area part becomes equal in sectional thickness to said projection forming area part.

10. The elongated shaft member of claim 9, wherein said elongated shaft member is formed of injection molding liquid resin.

* * * * *